United States Patent
Lim et al.

(10) Patent No.: US 11,411,219 B2
(45) Date of Patent: Aug. 9, 2022

(54) CALCINED CARBON MATERIAL FOR MAGNESIUM BATTERY ANODE AND METHOD FOR PREPARING THE SAME

(71) Applicants: KOREA INSTITUTE OF SCIENCE AND TECHNOLOGY, Seoul (KR); KOREA UNIVERSITY RESEARCH AND BUSINESS FOUNDATION, Seoul (KR)

(72) Inventors: Hee-Dae Lim, Seoul (KR); Si Hyoung Oh, Seoul (KR); Hun-Gi Jung, Seoul (KR); Minah Lee, Seoul (KR); Hyungseok Kim, Seoul (KR); Sang Ok Kim, Seoul (KR); Young Soo Yun, Incheon (KR)

(73) Assignees: Korea Institute of Science and Technology, Seoul (KR), part interest; Korea University Research and Business Foundation, Seoul (KR), part interest ( * ) Notice: Subject to any disclaimer, the term of this patent is extended or adjusted under 35 U.S.C. 154(b) by 265 days.

(21) Appl. No.: 16/817,757

(22) Filed: Mar. 13, 2020

(65) Prior Publication Data
US 2021/0167386 A1  Jun. 3, 2021

(30) Foreign Application Priority Data
Dec. 2, 2019 (KR) .................. 10-2019-0157936

(51) Int. Cl.
  *H01M 4/587* (2010.01)
  *H01M 10/054* (2010.01)
(Continued)

(52) U.S. Cl.
  CPC ............ *H01M 4/587* (2013.01); *H01G 9/008* (2013.01); *H01G 9/035* (2013.01); *H01G 9/042* (2013.01);
(Continued)

(58) Field of Classification Search
  CPC ............... H01M 4/587; H01M 10/054; H01M 10/0568; H01M 2004/027; H01G 9/008;
(Continued)

(56) References Cited

U.S. PATENT DOCUMENTS

2013/0302697 A1* 11/2013 Wang ................... H01M 4/485
                                                     977/749
2014/0211370 A1*  7/2014 Seymour ............... H01M 10/36
                                                     29/25.03

(Continued)

FOREIGN PATENT DOCUMENTS

JP          5162817 B2   3/2013
KR        101401062 B1   5/2014
KR    10-2019-0116012 A  10/2019

OTHER PUBLICATIONS

Burcu Dursun et al. "Pyrolyzed bacterial cellulose-supported SnO2 nanocomposites as high-capacity anode materials for sodium-ion batteries", Jun. 3, 2016.

(Continued)

*Primary Examiner* — Stewart A Fraser
(74) *Attorney, Agent, or Firm* — Rabin & Berdo, P.C.

(57) ABSTRACT

Disclosed is a calcined carbon material for a magnesium battery anode. The calcined carbon material includes catalytic carbon nanotemplates having a network structure in which nanofibers are entangled three-dimensionally. The calcined carbon material can be used as a magnesium battery anode material. Also disclosed is a method for preparing the calcined carbon material.

10 Claims, 31 Drawing Sheets

(51) Int. Cl.
  *H01M 10/0568* (2010.01)
  *H01G 9/042* (2006.01)
  *H01G 9/008* (2006.01)
  *H01G 9/035* (2006.01)
  *H01G 9/145* (2006.01)
  *H01M 4/02* (2006.01)

(52) U.S. Cl.
  CPC .......... *H01G 9/145* (2013.01); *H01M 10/054* (2013.01); *H01M 10/0568* (2013.01); *H01M 2004/027* (2013.01); *H01M 2300/0025* (2013.01)

(58) Field of Classification Search
  CPC ........ H01G 9/035; H01G 9/042; H01G 9/145; H01G 11/04; H01G 11/24; H01G 11/36; H01G 11/86
  See application file for complete search history.

(56) References Cited

U.S. PATENT DOCUMENTS

| | | | |
|---|---|---|---|
| 2016/0248100 A1* | 8/2016 | Joo | H01M 4/8882 |
| 2018/0297850 A1* | 10/2018 | Tour | C01B 32/162 |
| 2020/0052272 A1* | 2/2020 | Park | H01M 10/052 |

OTHER PUBLICATIONS

Mani Pujitha Illa et al. "Bacterial cellulose-derived carbon nanofibers as anode for lithium-ion batterie", Oct. 28, 2018.

Lim, Hee-Dae, et al., "Magnesiophilic Graphitic Carbon Nanosubstrate for Highly Efficient and Fast-Rechargeable Mg Metal Batteries", ACS Applied Materials & Interfaces, pp. 38754-38761, Sep. 30, 2019.

* cited by examiner

CALCINED CARBON MATERIAL FOR MAGNESIUM BATTERY ANODE AND METHOD FOR PREPARING THE SAME

CROSS-REFERENCE TO RELATED APPLICATIONS

This application claims priority under 35 U.S.C. § 119 to Korean Patent Application No. 10-2019-0157936 filed on Dec. 2, 2019 in the Korean Intellectual Property Office, the disclosure of which is incorporated herein by reference in its entirety.

BACKGROUND OF THE INVENTION

1. Field of the Invention

The present invention relates to a calcined carbon material for a magnesium battery anode including catalytic carbon nanotemplates having a network structure in which nanofibers are entangled three-dimensionally and a method for preparing the calcined carbon material.

2. Description of the Related Art

Batteries (or cells) produce electrical energy from physical or chemical reactions and supply power to the outside. Batteries are used where alternating current power supplied to buildings is not acquired in our living environment surrounded by various electrical/electronic devices. Batteries are also used when direct current power is required.

Among these batteries, primary batteries and secondary batteries are most common in use. Primary batteries and secondary batteries are chemical batteries based on chemical reactions. Primary batteries refer collectively to dry cells and are disposable batteries. In contrast, secondary batteries are rechargeable batteries that use materials capable of undergoing multiple reversible redox processes at the cathode and anode. Power is charged to a secondary battery when the cathode material is reduced by the electric current and power is discharged from the battery when the anode material is oxidized. As the charge-discharge cycle is repeated, an electric current is supplied.

A carbonaceous anode material for a secondary battery has a potential close to the electrode potential of an ionic metal and undergoes a small variation in crystal structure during intercalation and deintercalation of the ions, enabling continuous and repeated redox reactions at the electrodes. This provides a basis for high capacity and long lifetime of the secondary battery.

Rechargeable Mg batteries (RMBs) have attracted considerable attention, owing to the high theoretical volumetric capacity (~3,833 mAh/cm$^3$) of bivalent Mg metal, which is approximately 1.9 times higher than that of Li metal (2,046 mAh/cm$^3$) that is most widely used at present in lithium secondary batteries.

In addition, the non-toxic Mg metal has been reported to be free from alleviate dendritic metal growth, allowing it to be more reversible for electrochemical deposition/dissolution cycles and be highly stable. The host-free Mg metal anode (MMA) can deliver unlimited capacity and high rate capability, whereas absence of an applicable electrolyte system has been a major issue for MMA.

In particular, conventional electrolytes that are used widely for LIBs, such as carbonate- or ether-based solvents with the combination of TFSI$^-$ and PF$_6^-$ salts, form passivation layers (i.e., non-ion-conductive layer) on the Mg metal surface. These unwanted passivation layers inhibit the transport of Mg ions at the interface between the electrode and electrolyte, where the blocked ionic pathways strongly deteriorate the Coulombic efficiencies (CEs) of RMBs, resulting in poor cycling performance.

To address this issue, electrolytes based on Grignard reagents (RMgX, R=alkyl or aryl group and X=Cl or Br) have been developed. Although strong reducing agents could prevent the formation of passivation on the Mg surface, their practical applications have been hindered by its poor anodic stability.

Later, Aurbach et al. developed a new electrolyte system with improved anodic stability by mixing MgRR' (R and R'=ethyl and butyl) and aluminum Lewis acid (e.g., Bu$_2$Mg+ AlCl$_3$), and demonstrated its practicability on RMBs. Nevertheless, chloride-based compounds have poor stability because of their corrosiveness to common current collectors as well as packaging materials.

Therefore, despite the strenuous efforts over the past several decades, finding a suitable electrolyte for MMA is still a challenge. Furthermore, the overall electrochemical performance of RMBs needs to be improved before they can substitute for current Li-ion batteries, requiring a range of research strategies and attempts to secure the competitiveness of RMBs.

Although there has been relatively less research interest in the development of an anode system for RMBs, renewed interest has prompted studies on an efficient anode system. For example, MMA was coated with a carbon-based artificial interface layer to prevent direct contact between the Mg metal and electrolyte. This results in highly reversible Mg metal deposition/striping cycles in a conventional carbonate-based electrolyte system.

On the other hand, MMA has also been confronted by other important obstacles. The internal-short circuit caused by the poor wettability of the electrochemically generated Mg on the Mg substrate needs to be solved. In addition, the unexpected dendritic growth under abnormal conditions needs to be considered. Even with the use of Grignard reagents in a symmetric Mg—Mg cell, the formation of Mg dendrites was observed recently. These problems could be alleviated somewhat using other types of anode materials (i.e., alloying-/conversion-type materials). However, the development of a highly reversible MMA would be a key to achieving high-performance RMBs considering that the high volumetric energy density of RMBs can be achieved only when MMA is applied rather than an alloy type or conversion-based anode materials.

Despite this, there has been little improvement in the electrochemical performance of MMA, such as their rate capabilities, Coulombic efficiency (CE), and cycling stability.

PRIOR ART DOCUMENTS

Patent Documents

Patent Document 0001 Japanese Patent No. 5162817
Patent Document 0002 Korean Patent Publication No. 2019-0116012

SUMMARY OF THE INVENTION

One object of the present invention is to provide a calcined carbon material for a magnesium battery anode including catalytic carbon nanotemplates having a network structure in which nanofibers are entangled three-dimensionally.

A further object of the present invention is to provide a method for preparing the calcined carbon material.

Another object of the present invention is to provide a magnesium battery anode including the calcined carbon material.

Another object of the present invention is to provide a magnesium secondary battery including the magnesium battery anode.

Another object of the present invention is to provide a capacitor including the magnesium battery anode.

Still another object of the present invention is to provide a system including the magnesium battery anode.

A calcined carbon material for a magnesium battery anode according to one aspect of the present invention includes catalytic carbon nanotemplates having a network structure in which nanofibers are entangled three-dimensionally.

The nanofibers may be 10 to 25 nm in diameter and 10 μm to 1000 μm in length.

The calcined carbon material may contain a mixture of macropores having a pore size exceeding 50 nm and mesopores having a pore size of 20 to 30 nm.

The calcined carbon material may have a BET specific surface area of 90 to 120 $m^2/g$.

The calcined carbon material may be prepared from *Gluconacetobacter xylinum*.

A method for preparing a calcined carbon material for a magnesium battery anode according to a further aspect of the present invention includes (A) primarily heat-treating cellulose under a nitrogen gas atmosphere and (B) secondarily heat-treating the primarily heat-treated cellulose under an argon gas atmosphere.

Step (A) may be carried out at 600 to 1000° C. for 1 to 4 hours and step (B) may be carried out at 2500 to 3000° C. for 1 to 4 hours.

The cellulose may be isolated from *Gluconacetobacter xylinum*.

A magnesium battery anode according to another aspect of the present invention includes the calcined carbon material.

A magnesium secondary battery according to another aspect of the present invention includes the magnesium battery anode.

The magnesium secondary battery may use an all-phenyl complex electrolyte.

The all-phenyl complex electrolyte may be a mixture of aluminum chloride ($AlCl_3$) and phMgCl in a molar ratio of 1:3-7 in an organic solvent.

A capacitor according to another aspect of the present invention includes the magnesium battery anode.

A system according to yet another aspect of the present invention includes the magnesium battery anode.

The system may be selected from the group consisting of communication equipment, energy storage systems (ESSs), and vehicles.

The calcined carbon material of the present invention includes catalytic carbon nanotemplates having a network structure in which nanofibers are entangled three-dimensionally. Due to this structure, the calcined carbon material of the present invention has greatly improved Coulombic efficiency and cycling stability when used in an anode for a magnesium secondary battery. In addition, the calcined carbon material of the present invention has a catalytic effect on magnesium metal nucleation.

Furthermore, the calcined carbon material of the present invention reduces the plateau overpotential and nucleation overpotential, gradually increases the voltage optimization (VO) and potential gaps, and has high affinity for Mg ions.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1A:
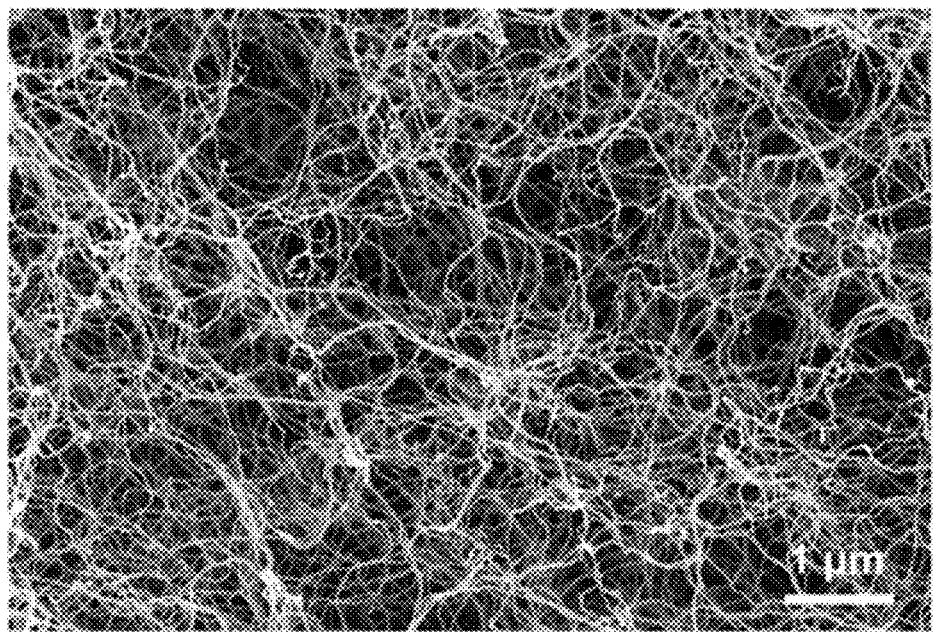
FIG. 1A shows an FE-SEM image.

The present invention is directed to a calcined carbon material for a magnesium battery anode including catalytic carbon nanotemplates having a network structure in which nanofibers are entangled three-dimensionally.

The numerous catalytic edges of the calcined carbon material are advantageous for Mg absorption, leading to an efficient metal plating/dissolution process. Due to its advantage, the calcined carbon material is used to achieve high performance of a magnesium battery.

The present invention will now be described in detail.

The present invention provides a calcined carbon material for a magnesium battery anode including catalytic carbon nanotemplates in which nanofibers are entangled three-dimensionally to form a complex network structure, including numerous macropores and mesopores, a few micrometers in width. The calcined carbon material of the present invention can accommodate magnesium with higher rate capabilities and Coulombic efficiencies than conventional metal substrates. Thus, a magnesium battery anode using the calcined carbon material of the present invention is stable even when operated over 1000 cycles.

While metal-based substrates suffer from undesirable Mg peeling-off, homogeneous Mg metal deposition is well guided in the calcined carbon material of the present invention, owing to the better affinity of $Mg^{2+}$ ions.

The calcined carbon material of the present invention is composed of nanofibers having a diameter of 10 to 25 nm, preferably 15 to 25 nm, and a length of 10 to 100 μm, preferably 10 to 60 μm.

The calcined carbon material is prepared by primarily calcining cellulose cryogel isolated from *Gluconacetobacter xylinum* under a nitrogen gas atmosphere and secondarily calcining the primarily calcined cellulose cryogel under an argon gas atmosphere to form a network structure in which the nanofibers having the diameter and length defined above are entangled three-dimensionally.

The calcined carbon material having a network structure has a BET specific surface area of 90 to 120 $m^2/g$, preferably 100 to 110 $m^2/g$, which is at least 800 to 1000 times higher than those of metal substrates.

If the diameter and length of the nanofibers are outside the respective ranges defined above, the desired BET specific surface area of the calcined carbon material is not ensured, the coexistence of mesopores and micropores cannot be expected, and either mesopores or micropores or both may be formed.

The calcined carbon material of the present invention contains a mixture of macropores and mesopores in a volume ratio of 1:0.1-0.6, preferably 1:0.2-0.4. The content of mesopores less than the lower limit defined above is not advantageous in magnesium absorption. Meanwhile, the content of mesopores exceeding the upper limit defined above may deteriorate the durability of the calcined carbon material.

The present invention also provides a method for preparing a calcined carbon material for a magnesium battery anode.

The method includes (A) primarily heat-treating cellulose under a nitrogen gas atmosphere and (B) secondarily heat-treating the primarily heat-treated cellulose under an argon gas atmosphere.

First, in step (A), cellulose is primarily heat-treated at 600 to 1000° C., preferably 700 to 900° C. for 1 to 4 hours, preferably 2 to 3 hours under a nitrogen gas atmosphere.

The cellulose is isolated from *Gluconacetobacter xylinum*. The use of cellulose isolated from other microorganisms such as *Acetobacter xylinum* leads to the formation of a network structure despite two heat treatments and fails to prepare a porous calcined carbon material containing a mixture of macropores and mesopores.

The primary heat treatment of the cellulose under a nitrogen gas atmosphere allows nanofibers to be entangled three-dimensionally. If the primary heat treatment temperature and time are outside the respective ranges defined above, nanofibers are not entangled three-dimensionally and finally a calcined carbon material having a network structure cannot be obtained.

Next, in step (B), the primarily heat-treated cellulose is secondarily heat-treated at 2500 to 3000° C., preferably 2700 to 2900° C. for 1 to 4 hours, preferably 2 to 3 hours under an argon gas atmosphere.

The secondary heat treatment of the primarily heat-treated cellulose under an argon gas atmosphere allows three-dimensionally entangled nanofibers to have a network structure and leads to the formation of a porous structure in which numerous macropores and mesopores are present. If the secondary heat treatment temperature and time are outside the respective ranges defined above, it is impossible to obtain a calcined carbon material having a network structure and a porous structure containing a mixture of macropores and mesopores.

In the case where either one of the primary and secondary heat treatments is not performed or the primary and secondary heat treatments are performed in the reverse order, it is impossible to obtain catalytic carbon nanotemplates having a network structure in which nanofibers are entangled three-dimensionally.

The present invention also provides a magnesium battery anode including the calcined carbon material having a network structure in which nanofibers are entangled three-dimensionally. The present invention also provides a magnesium secondary battery or magnesium capacitor including the magnesium battery anode.

Preferably, the magnesium secondary battery of the present invention uses an all-phenyl complex electrolyte together with the anode including the calcined carbon material. The all-phenyl complex electrolyte is preferably a mixture of aluminum chloride ($AlCl_3$) and phMgCl in a molar ratio of 1:3-7, more preferably 0.2 to 0.8 M aluminum chloride (AlCl3) and 1.0 to 3.0 M phMgCl in an organic solvent (THF).

The present invention also provides a system including the magnesium battery anode. The system may be selected from the group consisting of communication equipment, energy storage systems (ESSs), and vehicles.

The following examples are provided to assist in further understanding of the present invention. However, these examples are intended for illustrative purposes only. It will be evident to those skilled in the art that various modifications and variations can be made without departing from the scope and spirit of the present invention and such modifications and variations come within the scope of the appended claims.

Example 1

Preparation of Calcined Carbon Material

Bacterial cellulose pellicles (BCPs) were cultivated from *Gluconacetobacter xylinum* using a reported procedure. That is, *Gluconacetobacter xylinum* was pre-cultured in a test tube for one week and were then inoculated into a Petri dish containing Hestrin and Schramm medium. The cells in the Petri dish were incubated statically at room temperature for one week. The BCPs were purified in a 0.25 M NaOH aqueous solution for 48 h at room temperature to eliminate the cells and components of the culture liquid. The BCPs were washed thoroughly with distilled water until the pH reached 7.0. The cultivated BCPs were immersed in tert-butanol for solvent exchange for 6 h, and then freeze-dried at −40° C. and ~5 Pa for three days.

The resulting bacterial cellulose cryogel was treated thermally in a tube-furnace by 800° C. for two hours under $N_2$ gas flow of 200 ml/min. The carbonized cryogel was then heated in a graphite furnace (ThermVac, Korea) at 2,800° C. for two hours under an Ar atmosphere, where a heating rate of 5° C./min was applied, to obtain a calcined carbon material.

The product, graphitic carbon nanosubstrates (GC-NSs), were used without further treatment.

Comparative Example 1

Mo

Mo was used instead of the calcined carbon material prepared in Example 1.

Test Examples

Test Example 1

Structural Observations of the Calcined Carbon Material

Figure 1B:
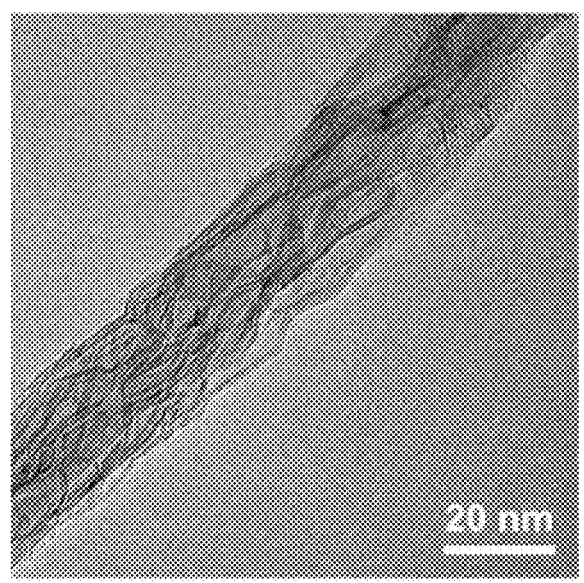
FIG. 1B shows an FE-TEM image.
Figure 1C:
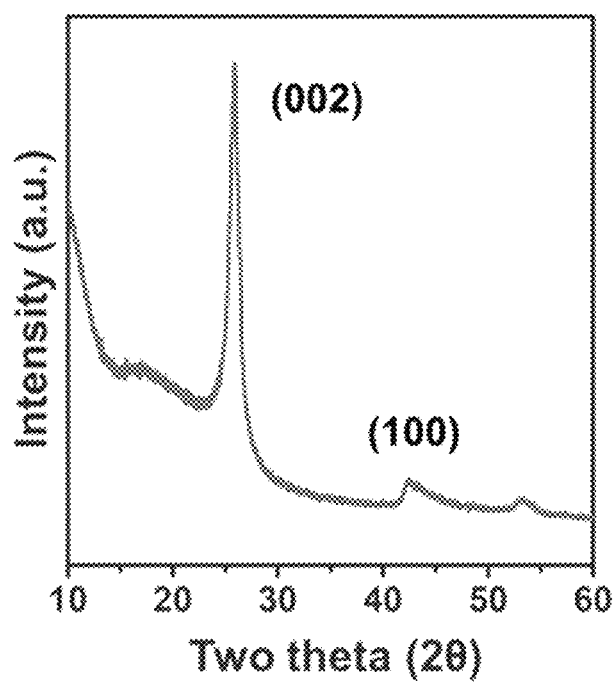
FIG. 1C shows an XRD pattern.
Figure 1D:
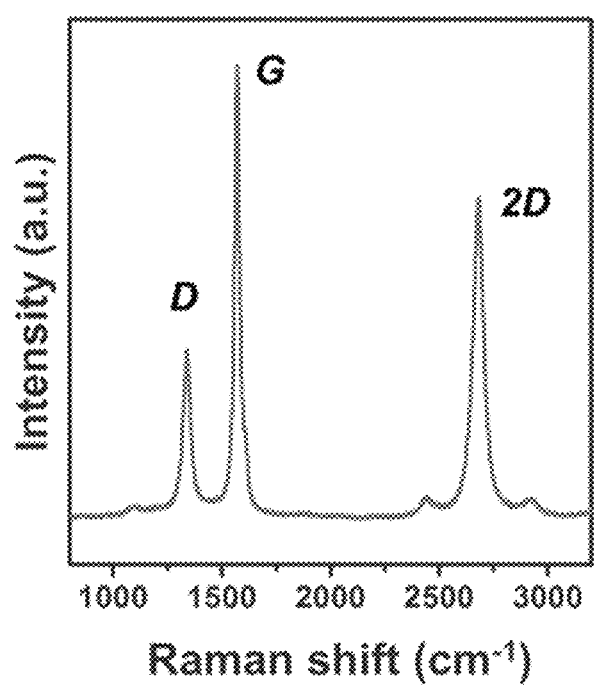
FIG. 1D shows a Raman spectrum.
Figure 1E:
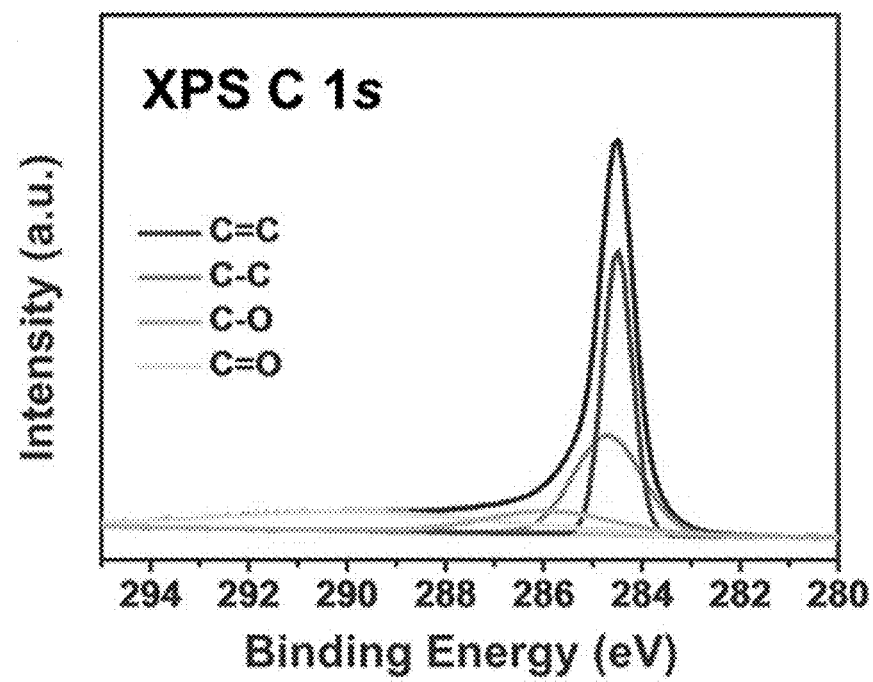
FIG. 1E shows an XPS C is spectrum.
Figure 1F:
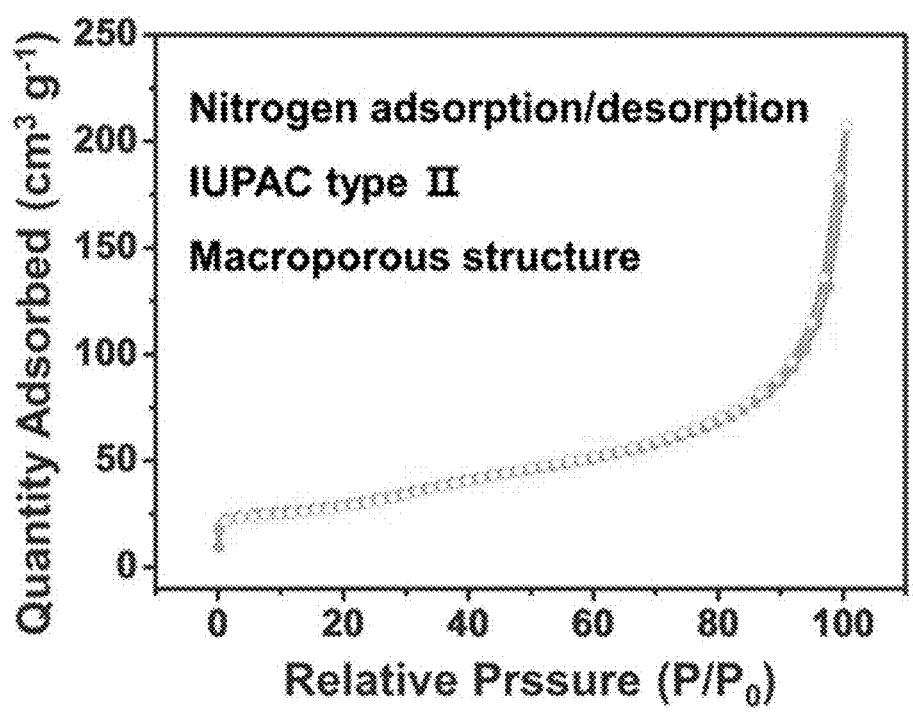
FIG. 1F shows a nitrogen adsorption/desorption isotherm curve.
Figure 1G:
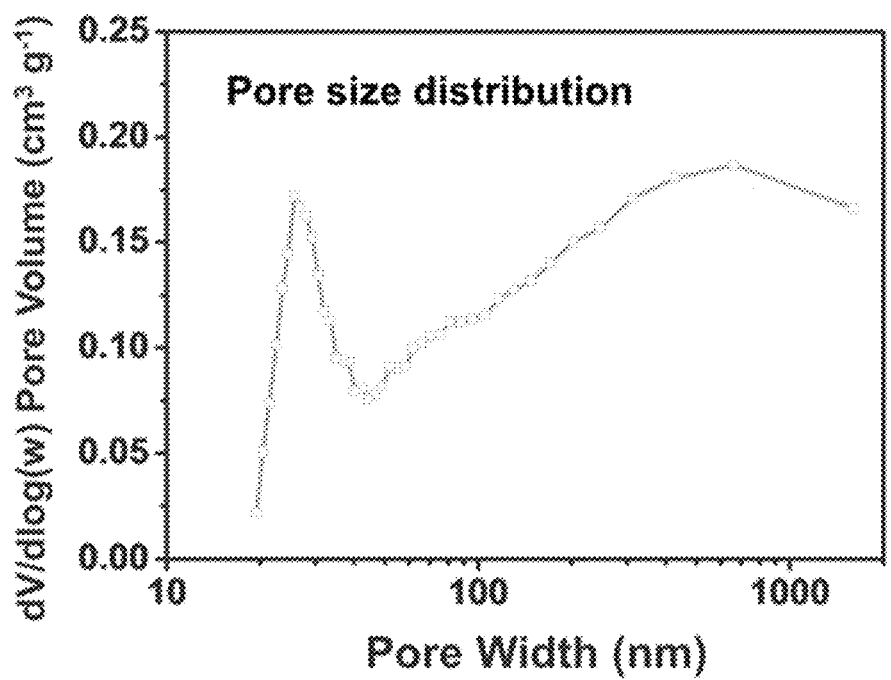
FIG. 1G shows pore size distribution data of a calcined carbon material prepared in Example 1.

FIG. 1A shows an FE-SEM image, FIG. 1B shows an FE-TEM image, FIG. 1C shows an XRD pattern, FIG. 1D shows a Raman spectrum, FIG. 1E shows an XPS C 1s spectrum, FIG. 1F shows a nitrogen adsorption/desorption isotherm curve, and FIG. 1G shows pore size distribution data of the calcined carbon material prepared in Example 1.

As shown in FIGS. 1A to 1G, high aspect ratio graphitic carbon nanofibers (GC-NFs) were entangled three-dimensionally to form a complex network structure, including numerous macropores and mesopores, a few micrometers in width (FIG. 1A). The diameters and lengths of the fibers constituting the calcined carbon material were 25 nm and >10 μm, respectively. The calcined carbon material exhibited an interesting shape in that several two-dimensional graphitic lattices were twisted three-dimensionally (FIG. 1B). The structures can expose a number of graphitic edge sites into the open surface, extending the catalytic sites for Mg metal nucleation.

The XRD pattern of the calcined carbon material proved the well-developed graphitic crystal structure, where a sharp graphite (002) peak was observed at 25.9° 2θ with smaller graphite (100) and (004) peaks at 43° and 54° 2θ, respectively (FIG. 1C).

In addition, the Raman spectrum revealed further specific microstructural information (FIG. 1D). A sharp G band at 1573 $cm^{-1}$ had more than double the intensity of the D band at 1340 $cm^{-1}$, indicating the presence of well-developed poly-hexagonal carbon structures. Moreover, the high intensity 2D band at 2688 $cm^{-1}$ indicated that the carbon structure had three-dimensional ordering.

The surface chemical structure of the calcined carbon material was observed by XPS (FIG. 1E). In the XPS C is spectrum, the main chemical bonding of the calcined carbon material was confirmed to be $sp^2$ C=C bonding at 284.4 eV. In addition, $sp^3$ C—C bonding with a high intensity was also observed at 284.8 eV, which could originate from the edge defects of poly-hexagonal carbon building blocks. One of the noteworthy results is the presence of oxygen functional groups, such as C—O and C=O at 285.6 and 289.9 eV, respectively. These oxygen groups could improve the wettability of the hydrophobic graphitic building blocks in the hydrophilic electrolyte system.

The porous properties of the calcined carbon material were characterized by nitrogen adsorption and desorption isotherm tests (FIGS. 1F and 1G). The isotherm curve exhibited a dramatic increase in the quantity of adsorbed nitrogen molecules in a >0.9 section of the relative pressure, indicating an International Union of Pure and Applied Chemistry type-II, macroporous structure (FIG. 1F). This coincides with the FE-SEM result shown in FIG. 1A.

The pore size distribution revealed mesopores having a mean pore volume of approximately 20~30 nm along macropores that were >50 nm in size (FIG. 1G). The approximately 20~30 nm sized pores could be induced by nitrogen adsorption on the surface of the respective fibers, whereas the larger ones could originate from the pores made by the nanoweb structure. For example, the macropores improve the impregnation efficiency of the electrolyte and the overall specific surface area of the calcined carbon material, and the mesopores allow rapid Mg adsorption/desorption.

The BET specific surface area of the calcined carbon material was ~105.3 $m^2 g^{-1}$, which is much higher than those of flat metal substrates.

Test Example 2

Measurement of Electrochemical Performance

Electrochemical Mg deposition tests on MMA based on the calcined carbon material prepared in Example 1 (GC-NS-Anode) and Mo substrate-based anode (Mo-Anode) were processed using the all-phenyl complex (APC) electrolyte (i.e., 0.5 M $AlCl_3$+2.0 M PhMgCl in THF).

Figure 2A:
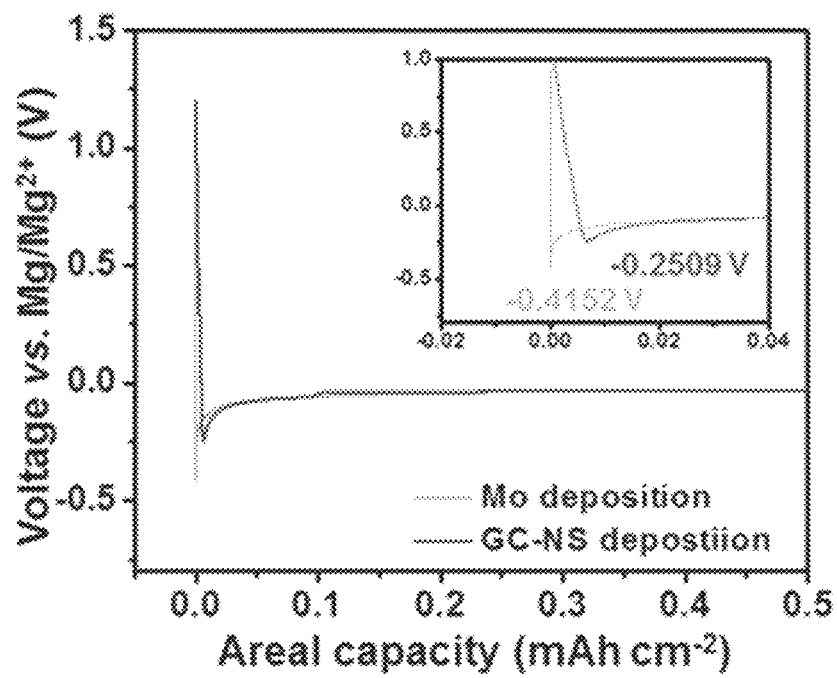
FIGS. 2A and 2B show nucleation overpotentials of GC-NS-Anode and Mo-Anode at a current rate of 0.2 $mA/cm^2$ and 2 $mA/cm^2$, respectively.
Figure 2B:
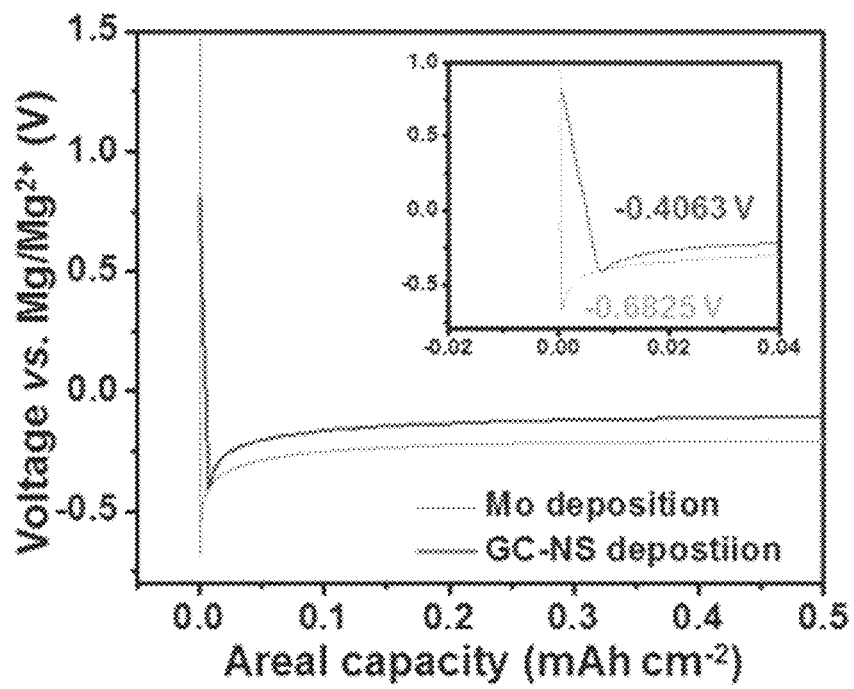
Figure 2C:
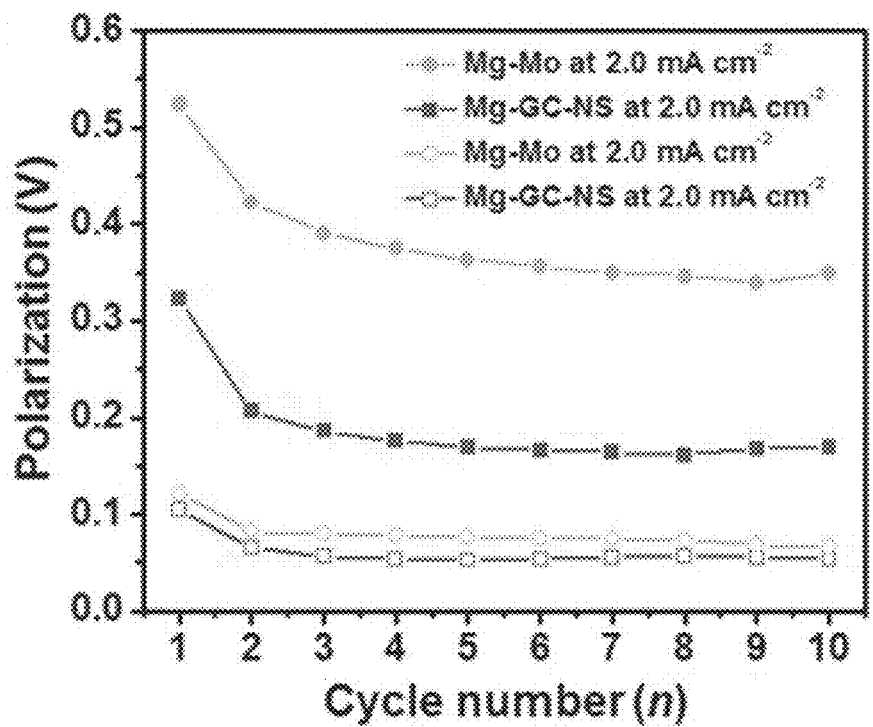
FIG. 2C shows voltage hysteresis of Mg plating/stripping at the initial 10 cycles.
Figure 2D:
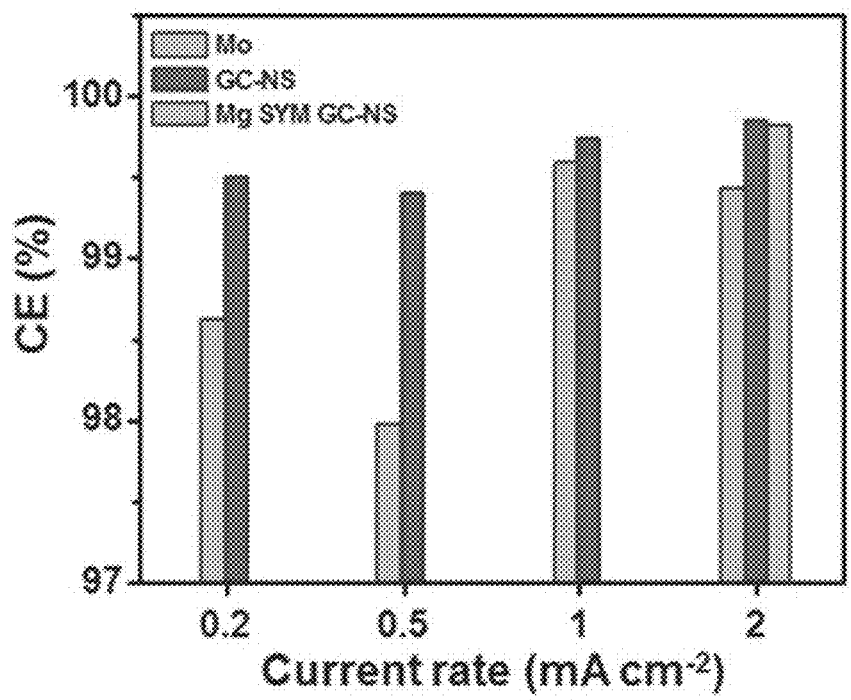
FIG. 2D shows current rate vs. CE relationships from 0.2 to 2 mA $cm^{-2}$.
Figure 2E:
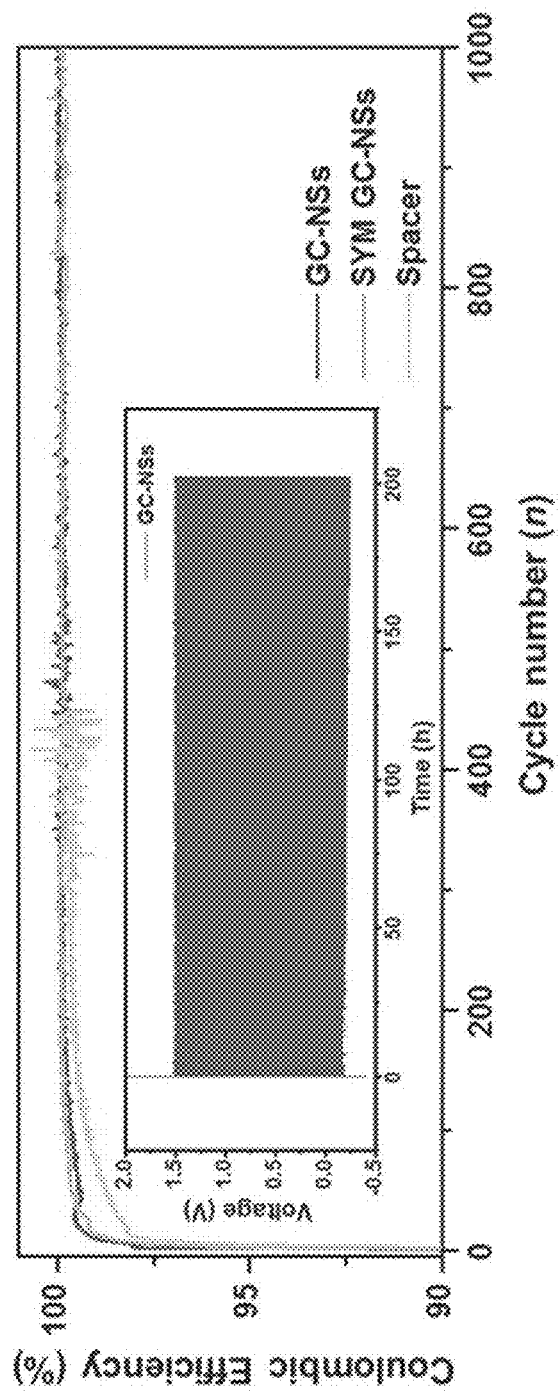
FIG. 2E shows cycling behaviors (The inset is a time vs. voltage plot of the GC-NS-Anode.
Figure 3A:
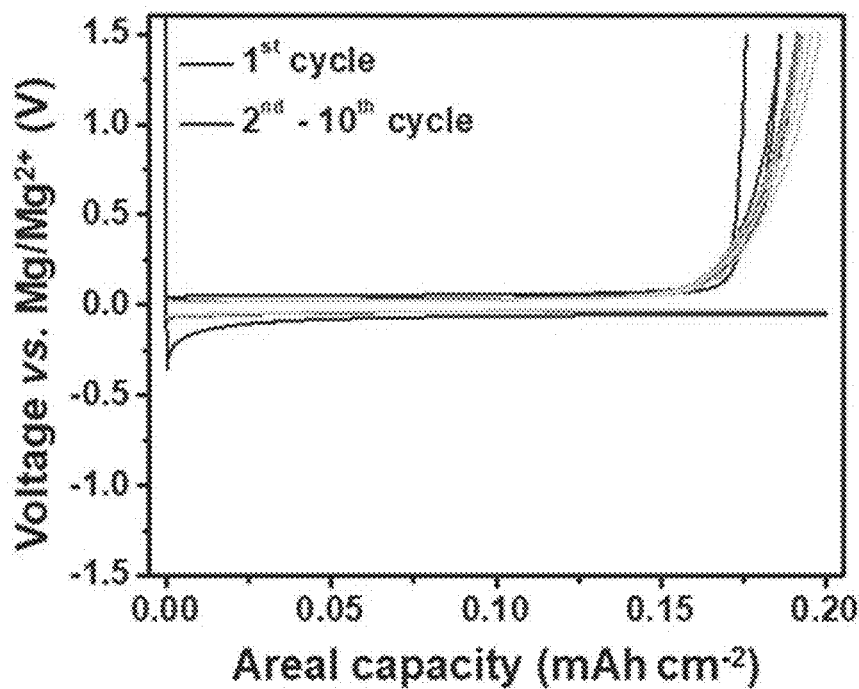
FIGS. 3A to 3D show galvanostatic Mg metal plating/striping cycles of Mo-Anodes at current rates of 0.2, 0.5, 1.0 and 2.0 $mA/cm^2$, respectively.
Figure 3B:
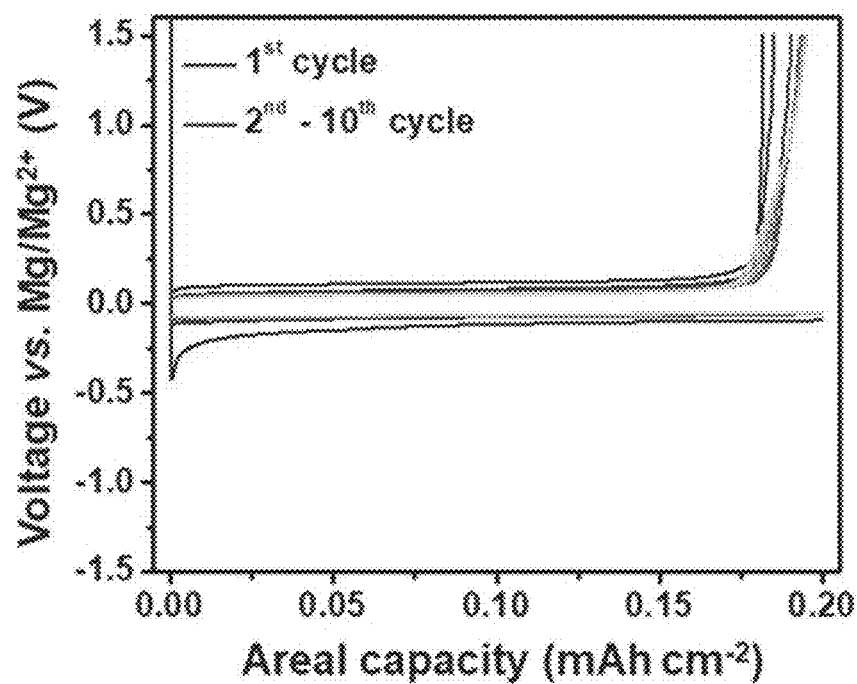
Figure 3C:
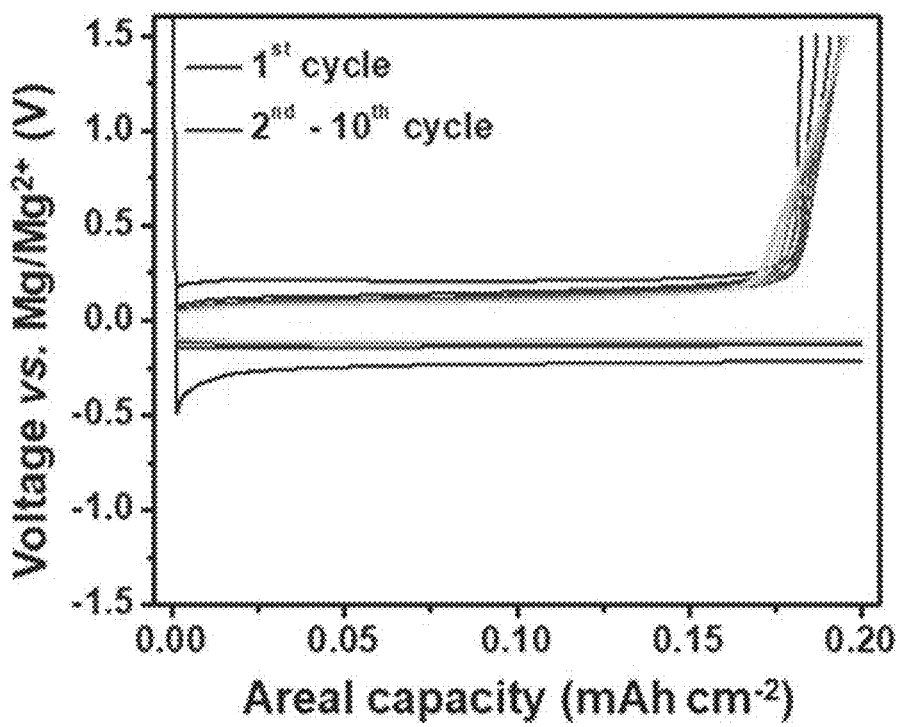
Figure 3D:
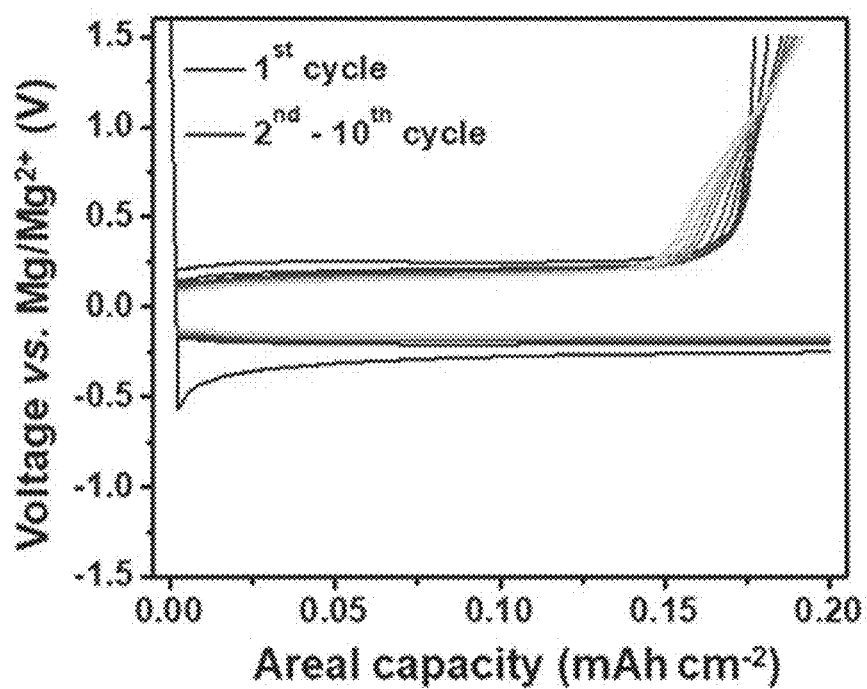
Figure 4A:
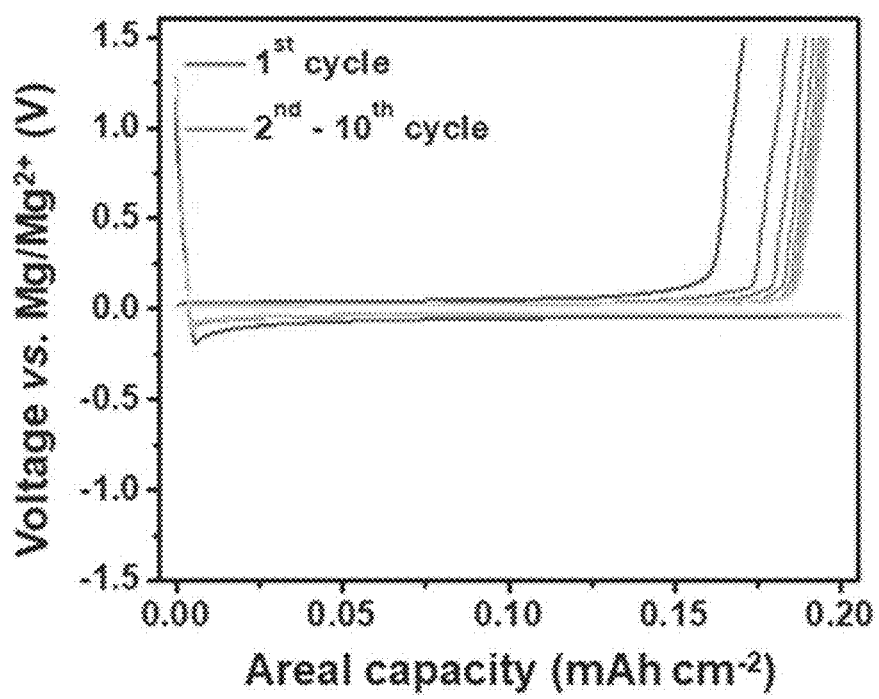
FIGS. 4A to 4D show galvanostatic Mg metal plating/striping cycles of GC-NS-Anodes at current rates of 0.2, 0.5, 1.0 and 2.0 $mA/cm^2$, respectively.
Figure 4B:
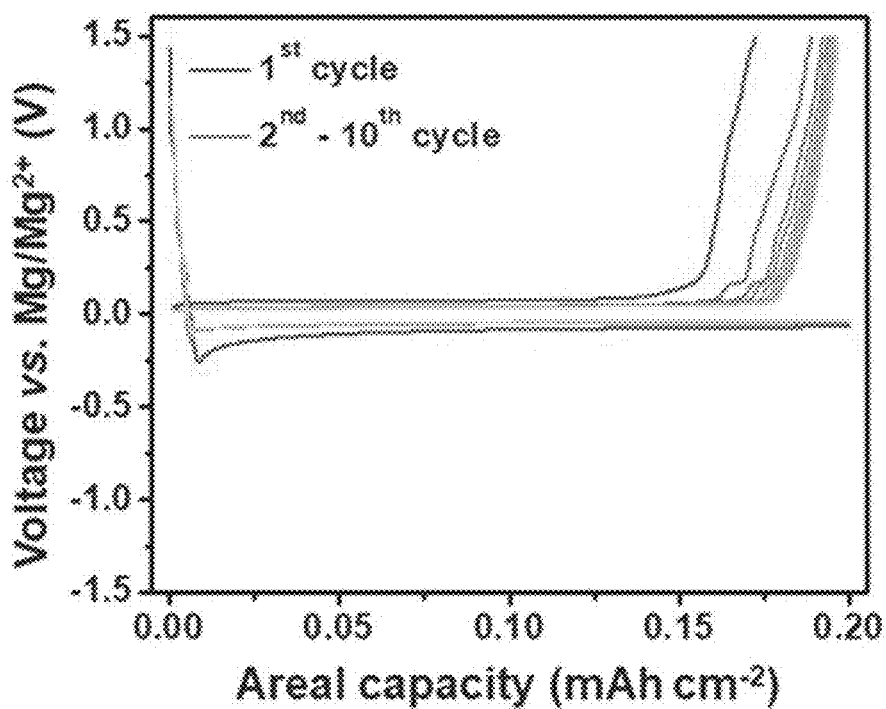
Figure 4C:
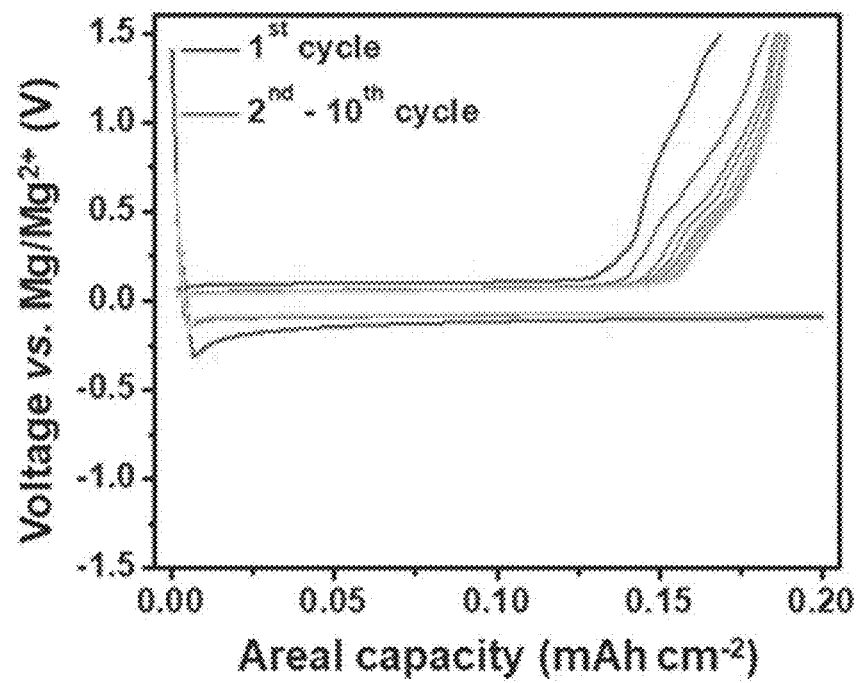
Figure 4D:
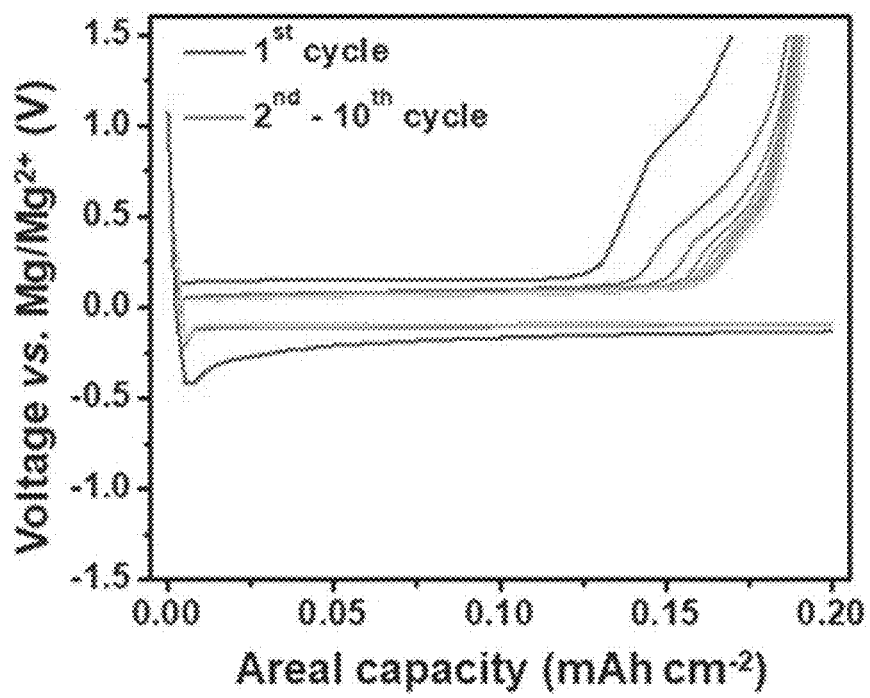
Figure 5A:
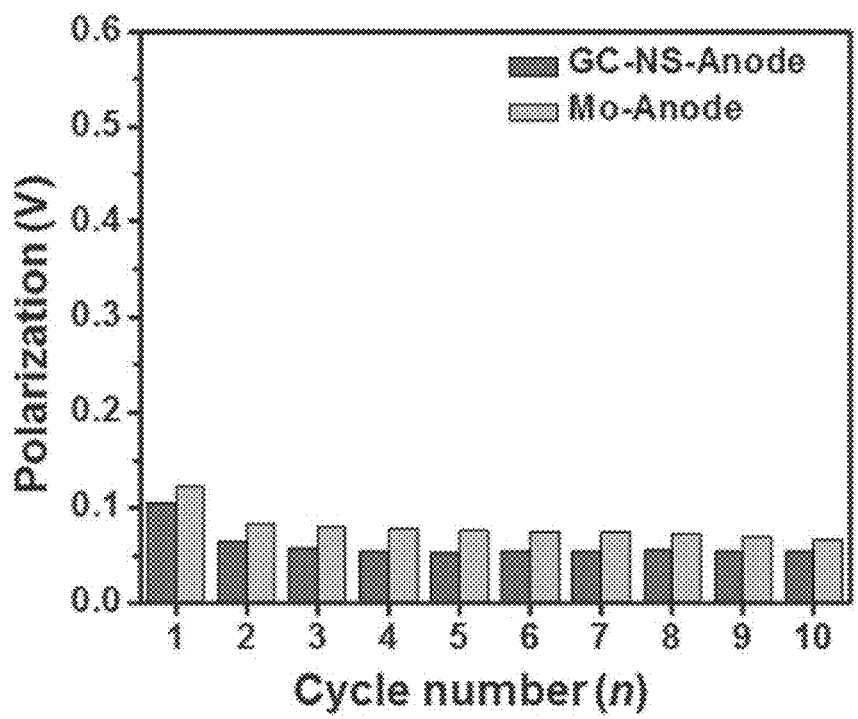
FIGS. 5A to 5D compare the average plateau overpotentials between GC-NS-Anode and Mo-Anode for galvanostatic Mg metal plating/striping profiles during 10 cycles at different current rates of 0.2, 0.5, 1.0 and 2.0 $mA/cm^2$, respectively.
Figure 5B:
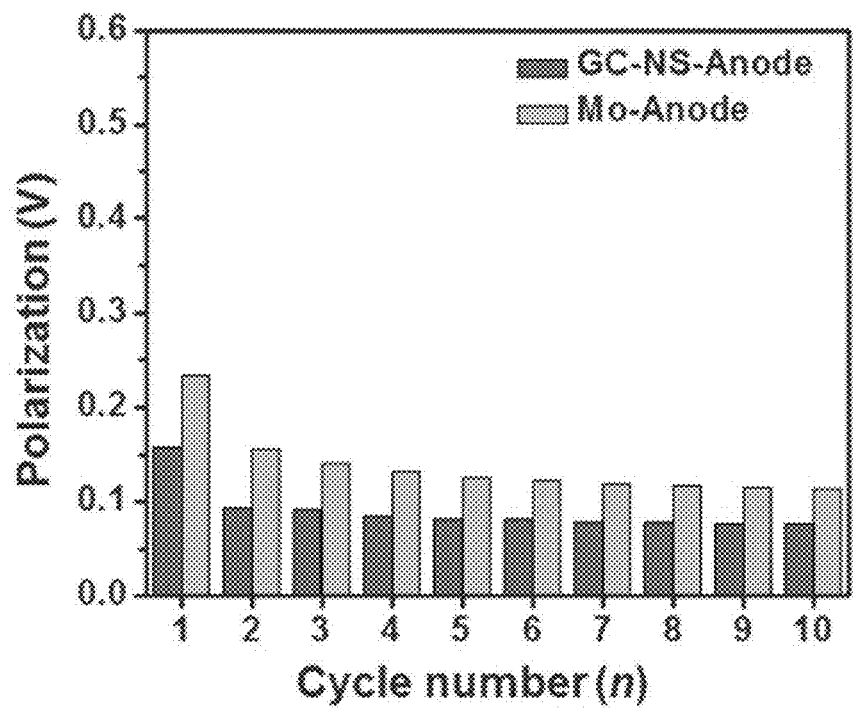
Figure 5C:
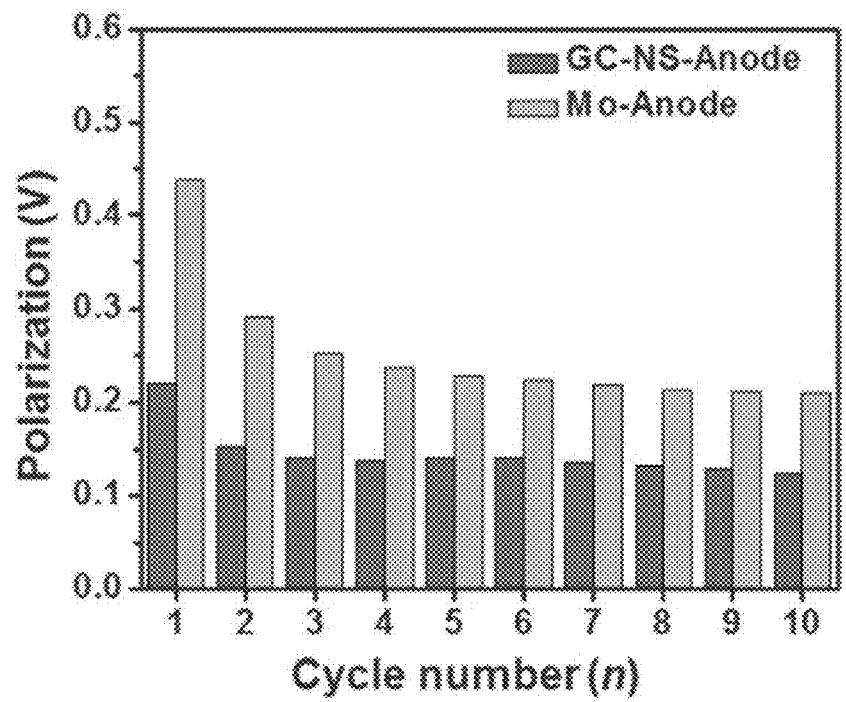
Figure 5D:
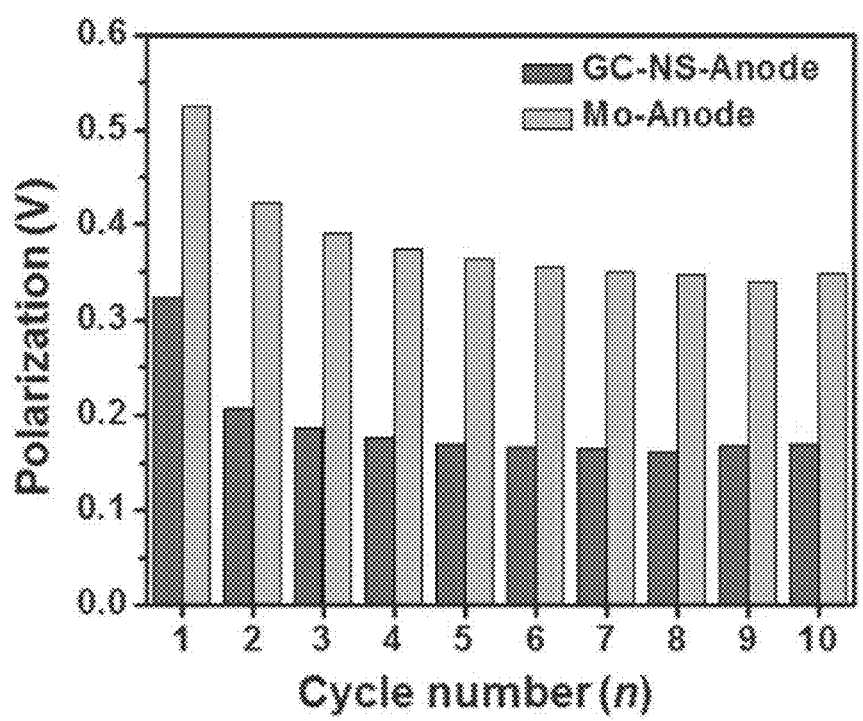

FIGS. 2A and 2B show nucleation overpotentials of GC-NS-Anode and Mo-Anode at a current rate of 0.2 $mA/cm^2$ and 2 $mA/cm^2$, respectively. FIG. 2C shows voltage hysteresis of Mg plating/stripping at the initial 10 cycles, FIG. 2D shows current rate vs. CE relationships from 0.2 to 2 mA $cm^{-2}$, and FIG. 2E shows cycling behaviors (the inset is a time vs. voltage plot of GC-NS-Anode.

FIGS. 3A to 3D show galvanostatic Mg metal plating/striping cycles of Mo-Anodes at current rates of 0.2, 0.5, 1.0 and 2.0 mA/cm², respectively. FIGS. 4A to 4D show galvanostatic Mg metal plating/striping cycles of GC-NS-Anodes at current rates of 0.2, 0.5, 1.0 and 2.0 mA/cm², respectively, and FIGS. 5A to 5D compare the average plateau overpotentials between the GC-NS-Anode and Mo-Anode for galvanostatic Mg metal plating/striping profiles during 10 cycles at different current rates of 0.2, 0.5, 1.0 and 2.0 mA/cm², respectively.

FIGS. 6A to 6D show deconvoluted XPS C 1s, O 1s, Mg 1s and Cl 2p spectra of GC-NS-Anode, respectively, after 1,000 discharge-charge cycles.

As shown in FIGS. 2A to 2E, the galvanostatic discharge profiles of both the GC-NS-Anode and Mo-Anode showed voltage overshoot (VO) at the initial deposition step, which could indicate nucleation polarization ($\eta_n$). According to classical metal nucleation theory, the formation of a new solid phase requires surplus free energy to overcome a nucleation energy barrier, which is exhibited as the VO in the galvanostatic discharge profile.

The initial nucleation overpotential of the Mo-Anode (~0.42 V) can be reduced significantly using the inventive calcined carbon material (GC-NSs) to ~0.25 V, corresponding to ~60% of the reduction from the Mo-Anode at a current density of 0.2 mA/cm² (FIG. 2A).

The nucleation polarization becomes significant as the current density was increased (FIG. 2B), and the gaps of the nucleation overpotentials between the two were broadened, reaching 0.27 V at a high current density of 2.0 mA/cm². Detailed electrochemical curves (Mg plating and stripping) for both the Mo-Anode and GC-NS-Anode at various current rates (0.2, 0.5, 1.0, and 2.0 mA/cm²) are provided in FIGS. 3A to 3D and 4. As shown in FIGS. 3A to 3D and 4, the nucleation overpotentials as well as dendritic growth would be more problematic at high current rates, and GC-NS-Anode could be a solution for alleviating the problems.

The overpotentials originating from ohmic polarization (i.e., plateau overpotential ($\eta_p$)) could also be reduced using the GC-NS-Anode. The GC-NS-Anode delivered a much lower plateau overpotential as well as a voltage hysteresis gap compared to the Mo-Anode, which could be observed clearly at a high current rate of 2.0 mA/cm² (FIG. 2B).

FIG. 2C presents the voltage hysteresis gap of each cycle for the GC-NS-Anode and Mo-Anode at two different current rates of 0.2 and 2.0 mA/cm². Similar to the results of nucleation polarization, the difference in their voltage hysteresis became more significant with increasing current rates. While the difference in the average polarization in the initial 10 cycles showed only a 0.018 V gap at a relatively mild current rate of 0.2 mA/cm², the huge gap of ~0.192 V was observed at a high current rate of 2.0 mA/cm², which is approximately 10 times higher polarization, producing significant energy loss. FIGS. 5A to 5D also compare the average plateau overpotentials under different current rates. These results suggest that the kinetic performance, including the nucleation and ohmic polarization of a bivalent Mg metal deposition/dissolution process, is strongly dependent on a host for Mg ions. Therefore, a state-of-the-art anode, such as the GC-NS-Anode, might be advantageous when designing high-rate-performance rechargeable magnesium batteries (RMBs).

The reductions of both the nucleation overpotential ($\eta_n$) and plateau overpotential ($\eta_p$) in the GC-NS-Anode can be explained in three ways.

First, the high surface area of the GC-NS-Anode can reduce the effective-current density at a given current rate, decreasing the overall resistance. Supposing that 1 mg of the calcined carbon material (GC-NSs) is used as the anode material, they can provide an approximately 1,000 times higher specific active surface area for deposited Mg metal than the Mo-Anode. Considering the much lower bulk density of GC-NSs (·0.53 g cm³) than those of Mo (10.3 g cm⁻³), Cu (~8.96 g cm⁻³), stainless steel (SS, ~8.0 g cm⁻³), and Al (2.7 g cm⁻³), the GC-NS-Anode-based rechargeable magnesium batteries (RMBs) can deliver a much higher specific energy density and higher power capabilities than the Mo—, Cu—, SS—, and Al-Anode-based rechargeable magnesium batteries.

Second, the three dimensionally entangled nanoweb structure with a high electrical conductivity of ~250 S/cm and numerous macropores and mesopores can supply electrons and ion transport pathways, enabling efficient Mg metal deposition/dissolution on the internal pores of GC-NSs. These two effects would explain the much reduced plateau overpotential ($\eta_p$) of the GC-NS-Anode compared to the Mo-Anode.

Third, the multitudinous catalytic sites of the GC-NS-Anode could provide numerous active sites for the nucleation of Mg metal, resulting in a reduced nucleation overpotential ($\eta_n$). The catalytic sites in the GC-NS-Anode help alleviate the overshooting voltage upon the initial Mg deposition, as shown in FIGS. 2A to 2E. They can favorably absorb and accommodate Mg ions, showing a reduced overpotential for the initial deposition, which is supported by the density functional theory calculation results described in the following.

The high reversibility of the Mg metal deposition/dissolution cycles was confirmed by calculating the average CEs of $10^{th}$~$100^{th}$ cycles at different current rates for both the GC-NS-Anode and Mo-Anode (FIG. 2D). At a current rate of 0.2 mA/cm², the GC-NS-Anodes showed an average CE value of ~99.6%, which increased gradually with increasing current rates and reached ~99.9% at current densities ≥2.0 mA/cm². In addition, the symmetric GC-NS-Anodes (SYM-GC-NS), which were assembled as a symmetric electrode configuration and Mg metal attached under one side of the electrode, showed a high CE value of ~99.9% at 2.0 mA/cm².

In contrast, the Mo-Anodes exhibited slightly lower average CE values of ~99.1% at 0.2 mA/cm², which reached a maximum value of ~99.6% at 1.0 mA/cm².

Figure 6A:
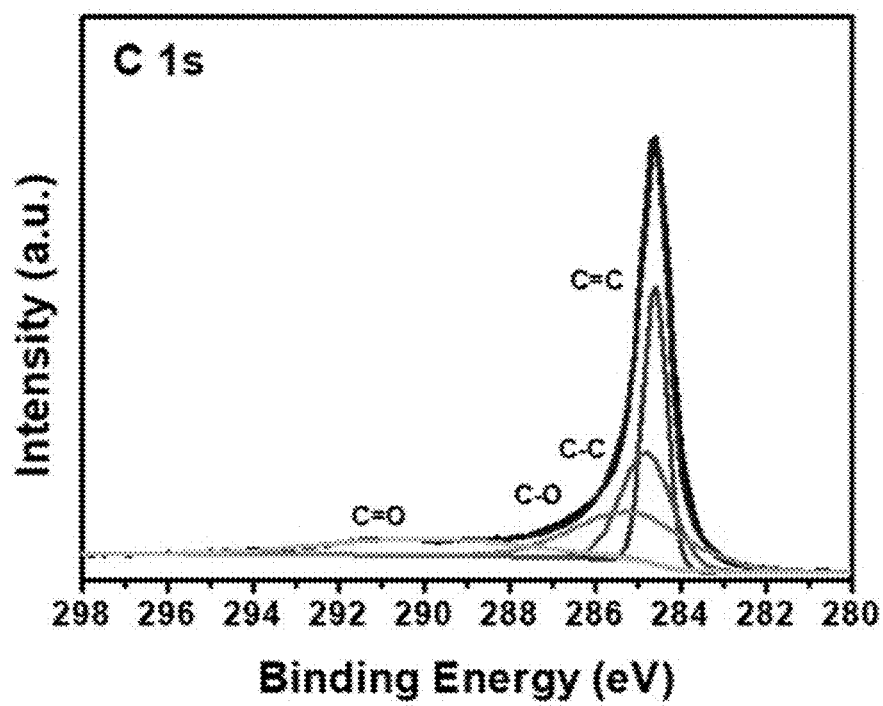
FIGS. 6A to 6D show deconvoluted XPS C 1 s, O 1 s, Mg 1s and Cl 2p spectra of GC-NS-Anode, respectively, after 1,000 discharge-charge cycles.
Figure 6B:
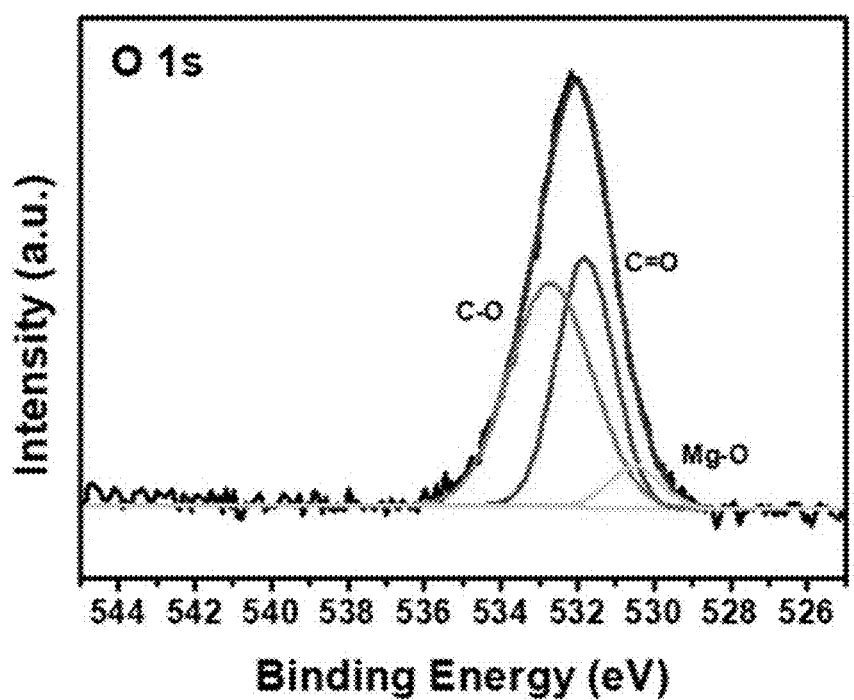
Figure 6C:
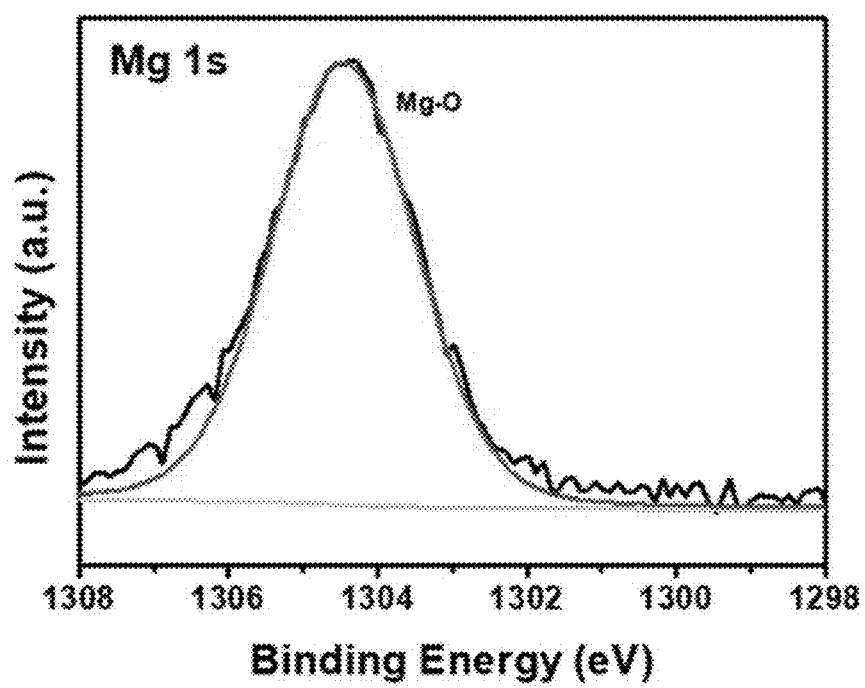
Figure 6D:
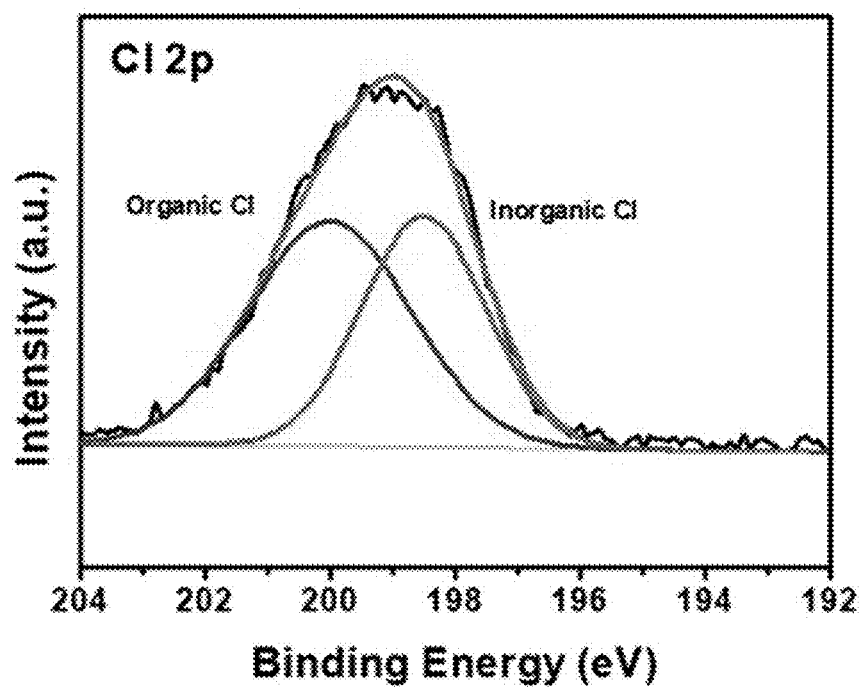

If 100 repetitive cycles are progressed by average CEs of 99.9% [$(0.999)^{100}$], ~90.5% of the initial capacity could be retained after 100 cycles. On the other hand, only ~67.0% of the initial capacity could be maintained after 100 cycles from average CEs of 99.6% [$(0.996)^{100}$]. This suggests that the slight decrease in CE results in a tremendous decrease in capacity, highlighting the superior reversibility of the GC-NS-Anodes. For both the GC-NS- and symmetric GC-NS-Anodes, stable Mg metal deposition/striping cycling was maintained during 1,000 cycles with high average CEs of ~99.9% (FIG. 2E). After the long-term cycling process, the carbon structure of the calcined carbon material (GC-NS) is well-maintained (FIGS. 6A to 6D). Specifically, the calcined carbon material (GC-NSs) after 1,000 galvanostatic discharge-charge cycles were characterized by in situ XPS. In FIG. 6A, the deconvoluted C is spectra show a sharp sp2 carbon-carbon double bond peak similar to that of the pristine calcined carbon material (GC-NSs), but with more intense carbon-oxygen single/double bonding peaks. At higher oxygen contents (FIG. 6B), magnesium oxide and organic/inorganic Cl groups were detected after cycling (FIGS. 6C and 6D). However, the O/C, Mg/C, and Cl/C atomic ratios were only 0.017, 0.082 and 0.027, respectively, indicating that the carbon structure of the calcined carbon material (GC-NSs) was well-maintained after the long-term cycling process.

In contrast, the Mo-Anode showed large fluctuations of the CE values after approximately 300 cycles, which lasted for ~450 cycles with a relatively low average CE of ~99.6%.

Test Example 3

Figure 7A:
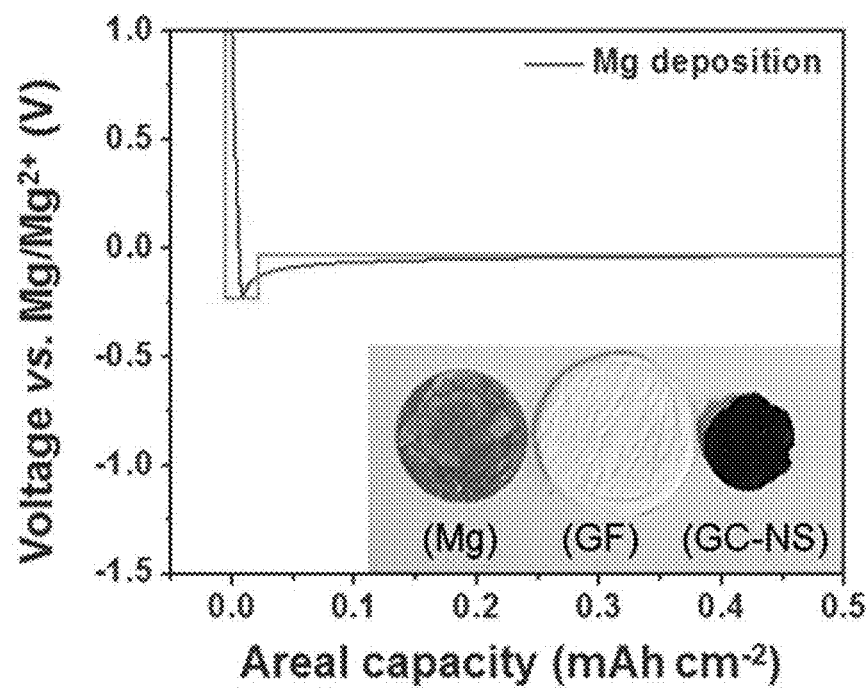
FIGS. 7A to 7F show the nucleation polarization for Mg plating on different substrates, such as GC-NS, Mo, Cu, SS, Mg metal with a GF separator, and for Mg plating on Mg metal with a polypropylene separator. The insets of each figure show the ex situ cell components after Mg deposition by the areal capacities of 5 $mAh/cm^2$ at a current rate of 0.2 $mA/cm^2$.
Figure 7B:
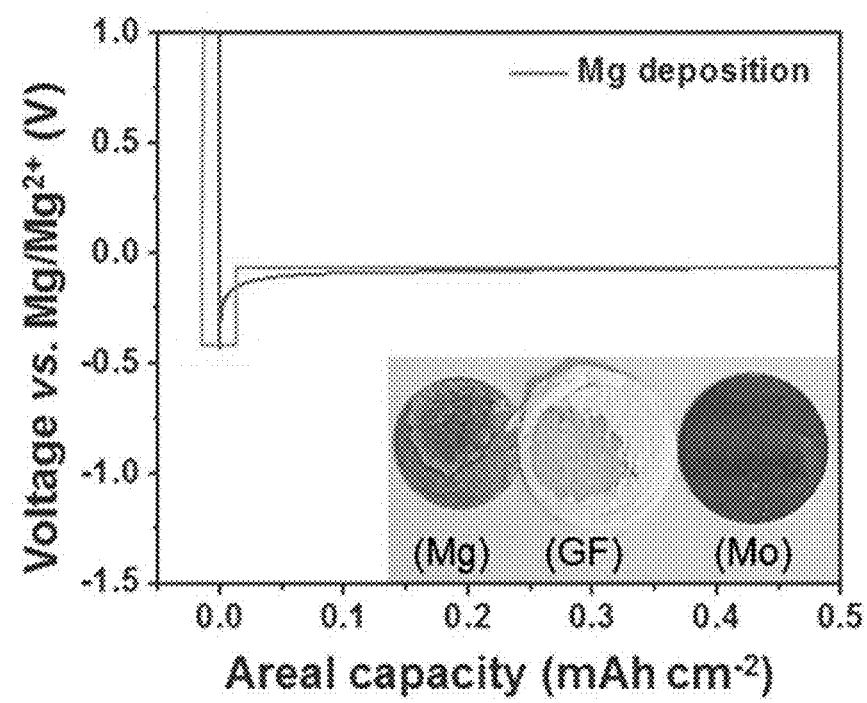
Figure 7C:
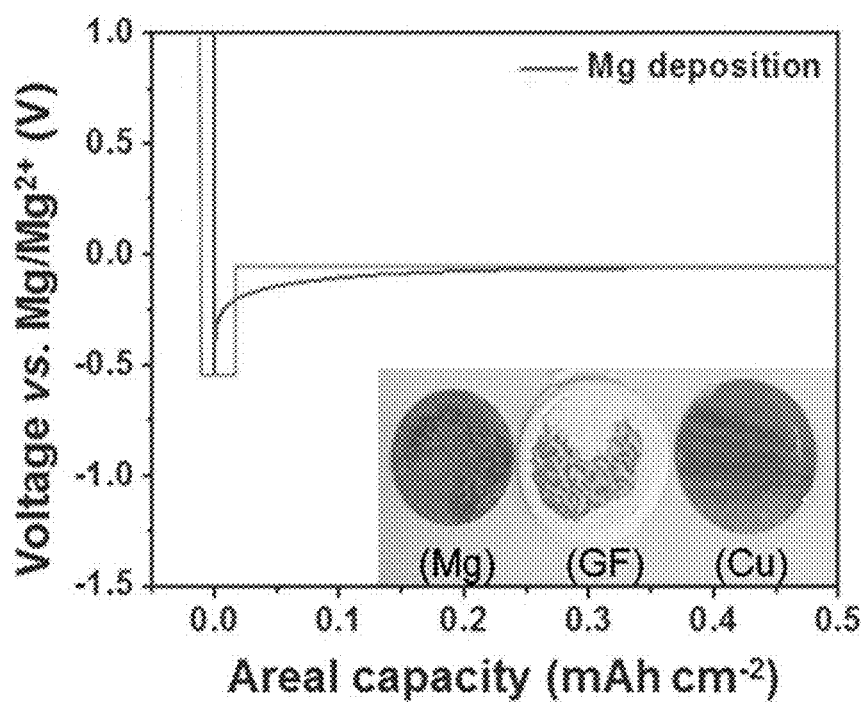
Figure 7D:
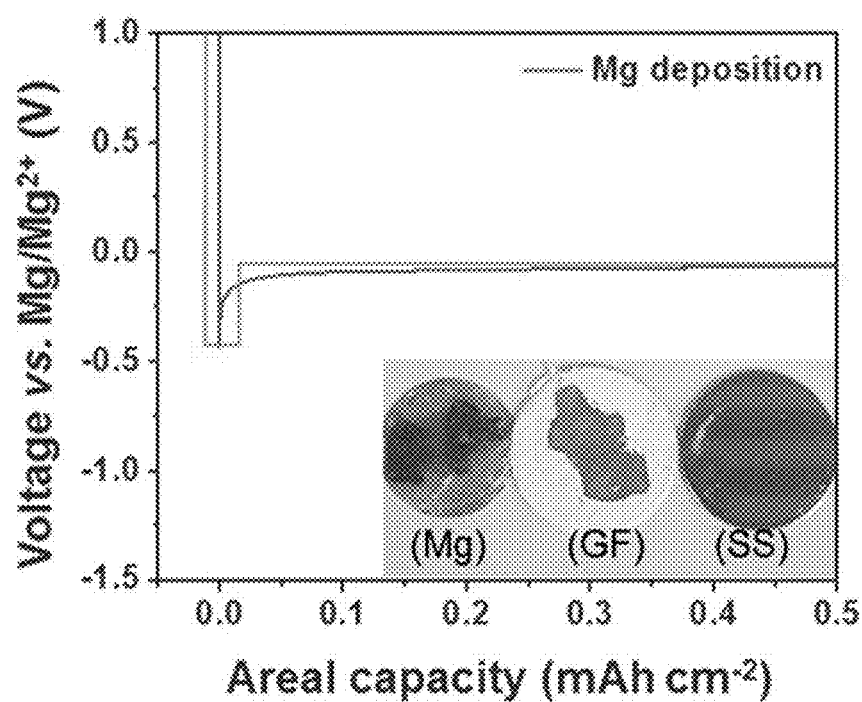
Figure 7E:
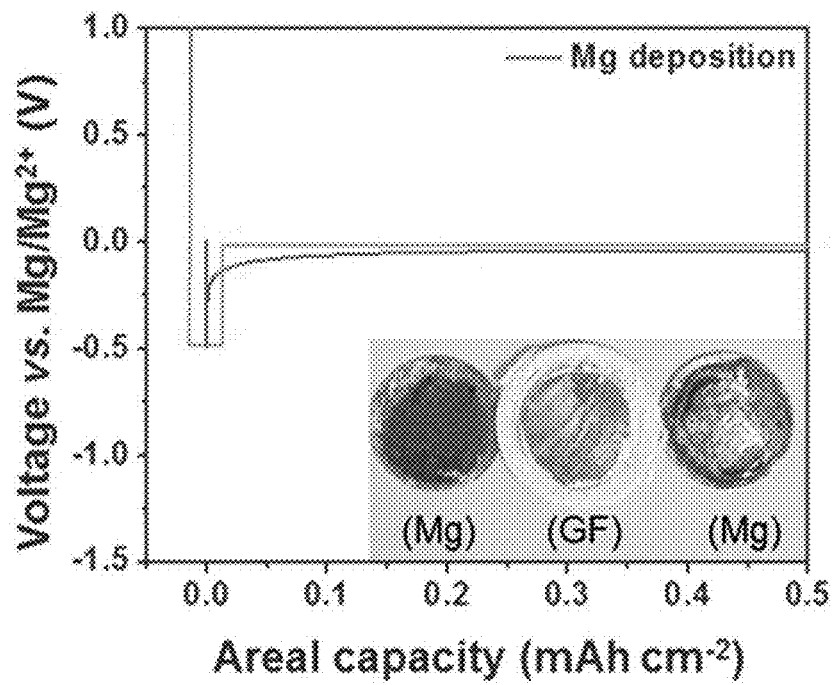
Figure 7F:
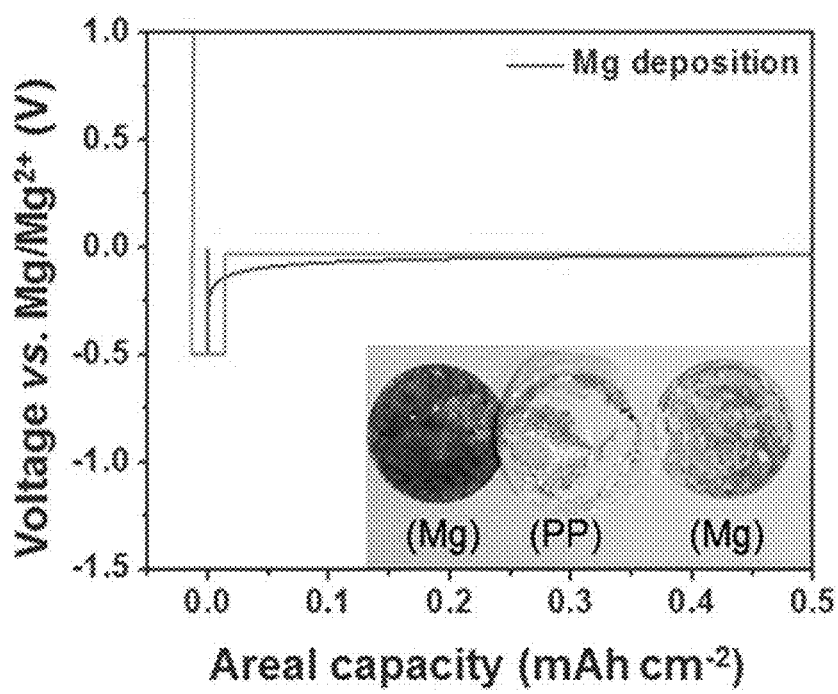

Comparison of the Electrochemical Performance of the GC-NS-Anode with Other Metal-Based Anodes FIGS. 7A to 7F show the nucleation polarization for Mg plating on different substrates, such as GC-NS (FIG. 7A), Mo (FIG. 7B), Cu (FIG. 7C), SS (FIG. 7D), Mg metal with a GF separator (FIG. 7E), and for Mg plating on Mg metal with a polypropylene separator (FIG. 7F). The insets of each figure show the ex situ cell components after Mg deposition by the areal capacities of 5 mAh/$cm^2$ at a current rate of 0.2 mA/$cm^2$.

FIGS. 8A to 8F show XRD patterns of the Mo-Anode (FIG. 8A) and GF separator (FIG. 8D) faced with the Mo-Anode after Mg metal deposition with an areal capacity of 5 mAh/$cm^2$ at a current rate of 0.2 mA/$cm^2$, SEM images of the Mo-Anode (FIG. 8B) and GF separator (FIG. 8E) before Mg metal deposition, and SEM images of the Mo-Anode (FIG. 8C) and GF separator (FIG. 8F) after Mg metal deposition.

FIGS. 9A to 9F shows XRD patterns of the GC-NS-Anode (FIG. 9A) and GF separator (FIG. 9D) faced with the GC-NS-Anode after Mg metal deposition with an areal capacity of 5 mAh/$cm^2$ at a current rate of 0.2 mA/$cm^2$, SEM images of the GC-NS-Anode (FIG. 9B) and GF separator (FIG. 9E) before Mg metal deposition, and SEM images of the GC-NS-Anode (FIG. 9C) and GF separator (FIG. 9F) after Mg metal deposition.

Figure 10A:
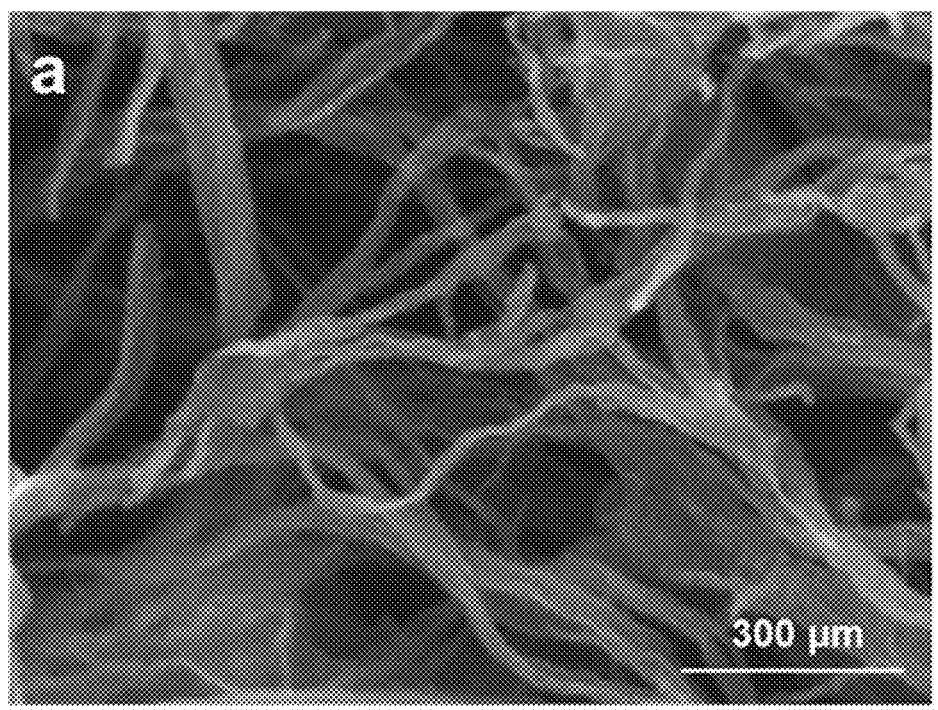
FIGS. 10A to 10C show an FE-SEM image (FIG. 10A), energy Dispersive Spectrometry (EDS) mapping data (FIG. 10B) and EDS spectra of GC-NS-Anode (FIG. 10C) after Mg metal deposition with an areal capacity of 0.05 $mAh/cm^2$. The inset table shows the results of SEM-EDS elemental analysis.
Figure 10B:
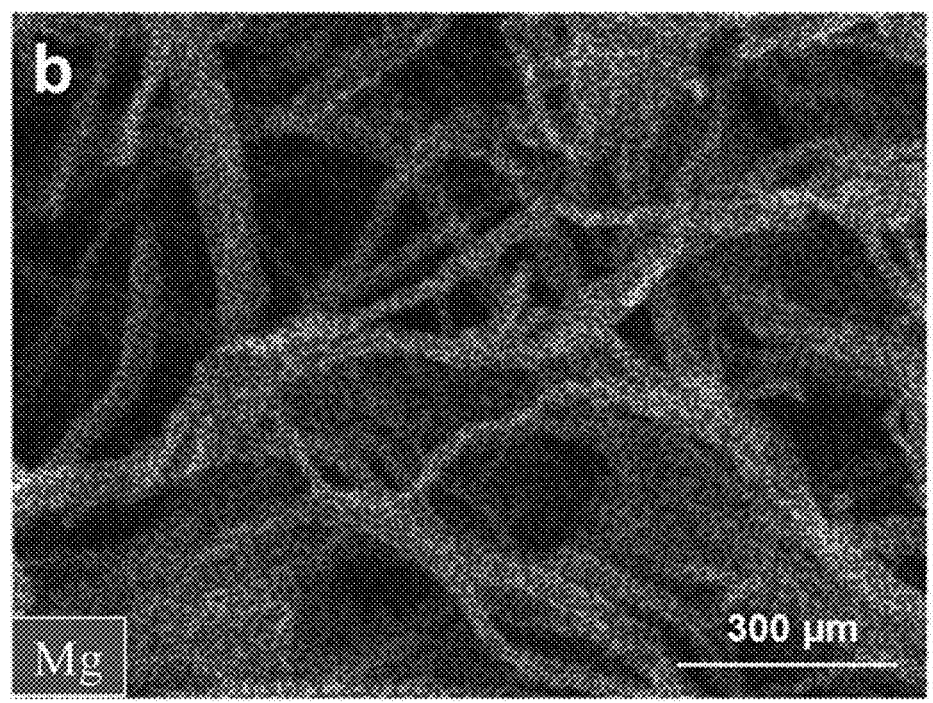
Figure 10C:
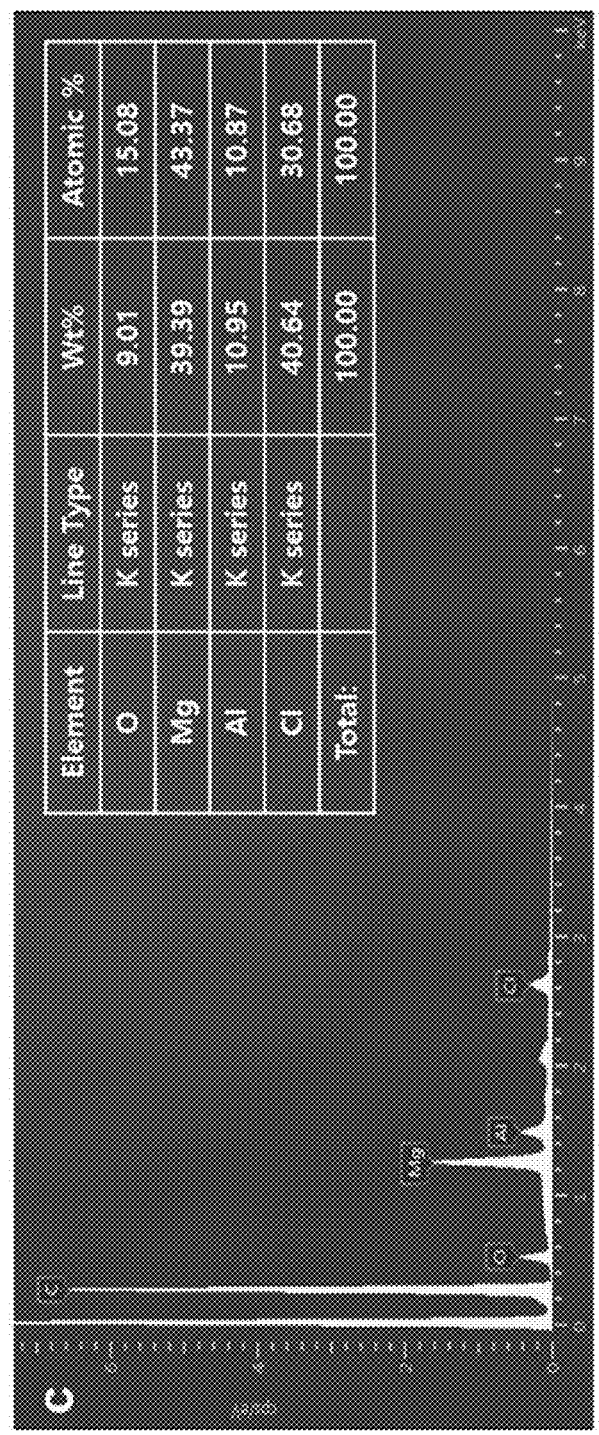

FIGS. 10A to 10C show an FE-SEM image (FIG. 10A), energy Dispersive Spectrometry (EDS) mapping data (FIG. 10B) and EDS spectra of the GC-NS-Anode (FIG. 10C) after Mg metal deposition with an areal capacity of 0.05 mAh/$cm^2$. The inset table shows the results of SEM-EDS elemental analysis.

To compare the electrochemical performance of the GC-NS-Anode with other metal-based anodes (Mo, Cu, SS, and Mg), they were assembled into 2032-type coin cells and the same amount of Mg (0.5 mA h/g) was deposited electrochemically on them (FIGS. 7A to 7F).

In the galvanostatic Mg metal deposition profile, the initial overshooting voltage of the GC-NS-Anode (0.20 V, FIG. 7A) was lower than the other types of substrates (Mo: 0.37 V, Cu: 0.53 V, SS: 0.43 V), and even lower than that of the Mg—Mg symmetric cell (0.49 V in FIG. 7E).

The appearance polarization, including the initial shooting voltage and plateau overpotential, which is indicated by the blue line, highlight the superior kinetic performance of the GC-NS-Anode for the deposition Mg ions. Interestingly, the GC-NS-Anode showed better accessibility and superior ability to accommodate Mg ions than the other types of substrates. The inset in FIG. 7A to 7F present images of the cell components of Mg metal, GF, as well as the substrates after deposition. The images of the ex-situ cell with the GC-NS-Anode revealed a clean GF separator (FIG. 7A), whereas the GF separators of the other ex-situ cells with metal-based anodes were stained by deposited Mg metal (FIG. 7B to 7D). In all metal-based substrates, most of the deposited Mg metal was stuck to the GF separator, which means that the direct growth of Mg metal on the substrate surface is unfavorable.

Even in the case of the Mg—Mg symmetric cell (FIG. 7E), $Mg^{2+}$ ions deposited preferentially in the GF separator instead of the Mg anode. The Mg metal deposition behavior on separator was also observed, when a relatively thin and dense polypropylene (PP) separator was used (FIG. 7F).

The poor wettability for the newly deposited Mg metal was recently discussed, and highlighted as a crucial problem in the current rechargeable magnesium batteries (RMBs). The unwanted metal deposition in the non-conducting separators can deteriorate the CEs and cycling performance of RMBs significantly by clogging the separators.

In this regard, the favorable Mg metal deposition on GC-NS-Anodes can explain why it could deliver improved CEs and cyclability, as shown in FIGS. 2D and 2E.

Figure 8A:
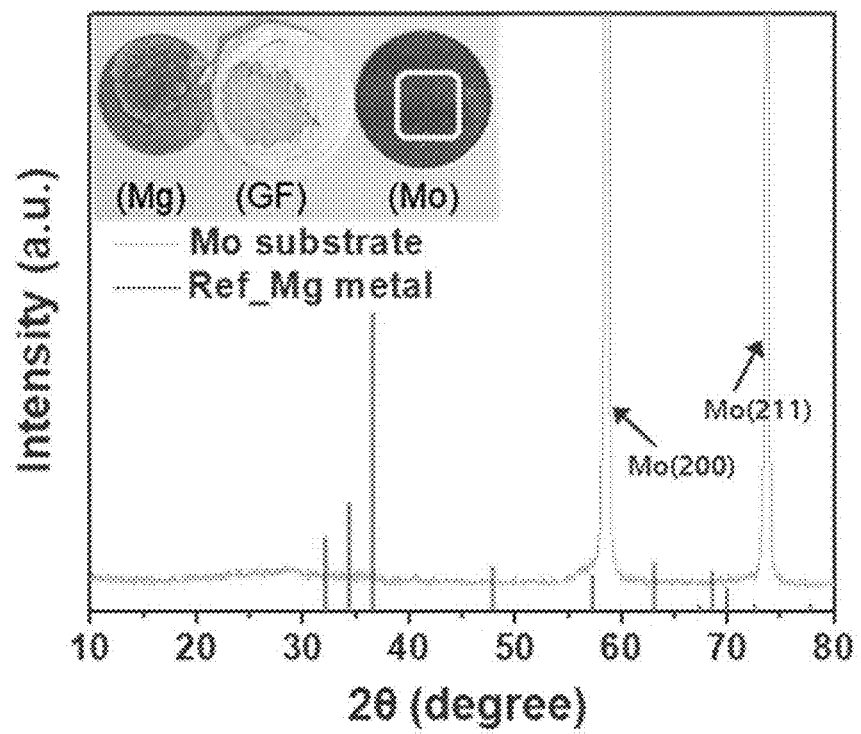
FIGS. 8A to 8F show XRD patterns of Mo-Anode (FIG. 8A) and GF separator (FIG. 8D) faced with the Mo-Anode after Mg metal deposition with an areal capacity of 5 $mAh/cm^2$ at a current rate of 0.2 $mA/cm^2$, SEM images of the Mo-Anode (FIG. 8B) and GF separator (FIG. 8E) before Mg metal deposition, and SEM images of (c) the Mo-Anode (FIG. 8C) and GF separator (FIG. 8F) after Mg metal deposition.
Figure 8B:
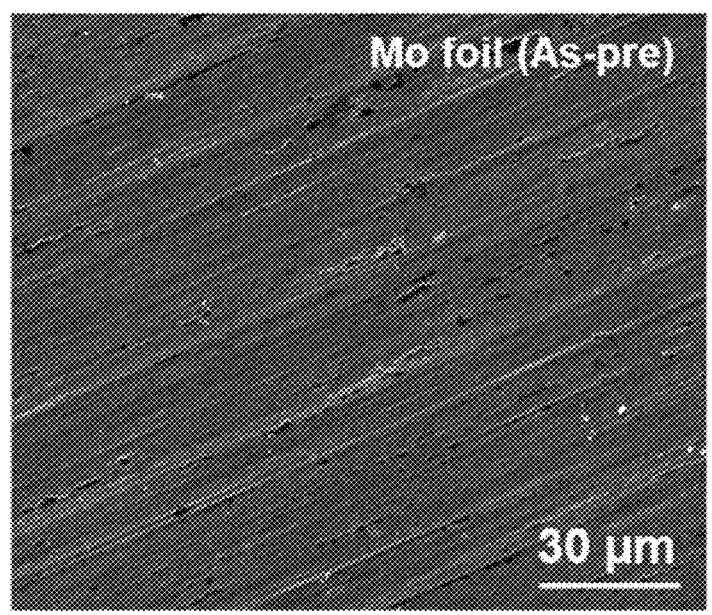
Figure 8C:
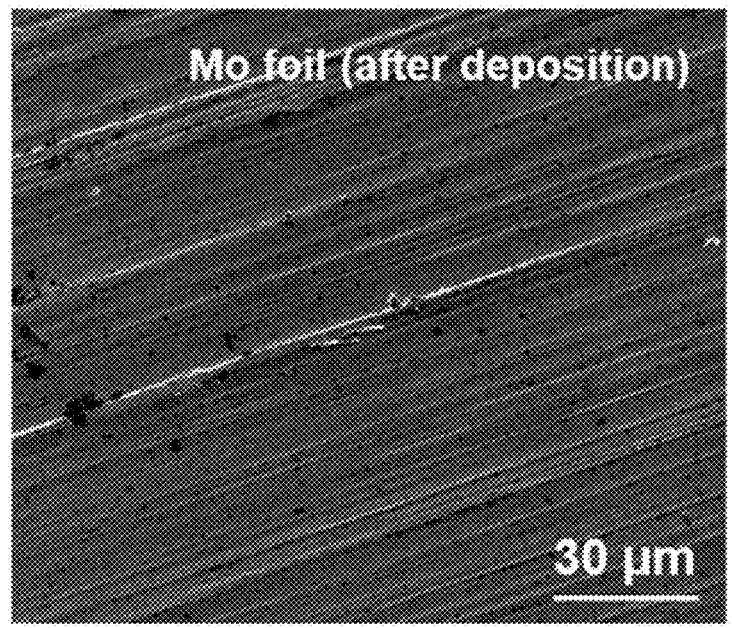
Figure 8D:
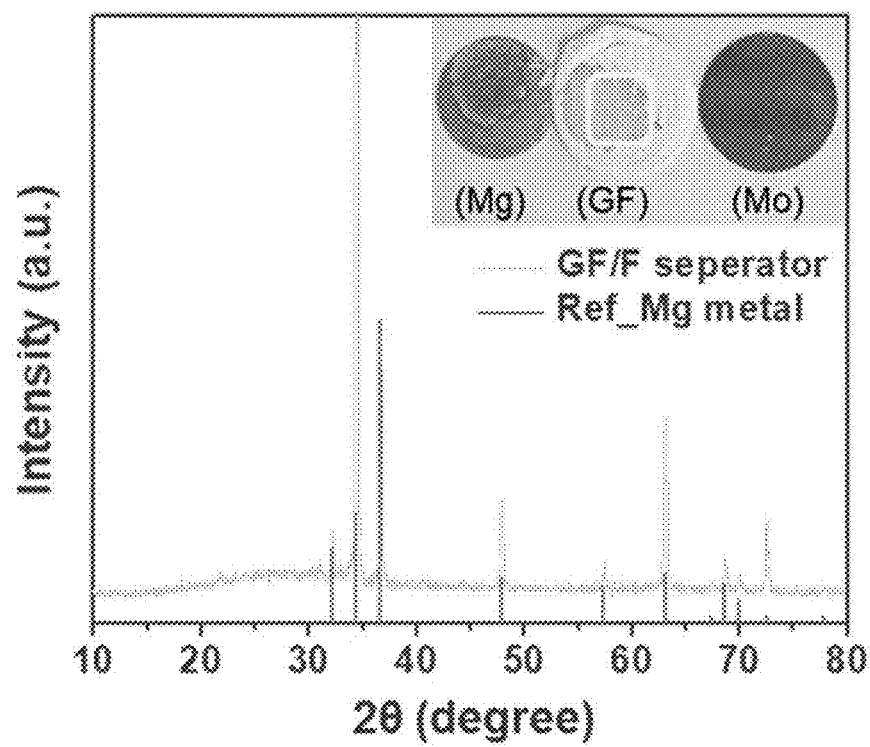
Figure 8E:
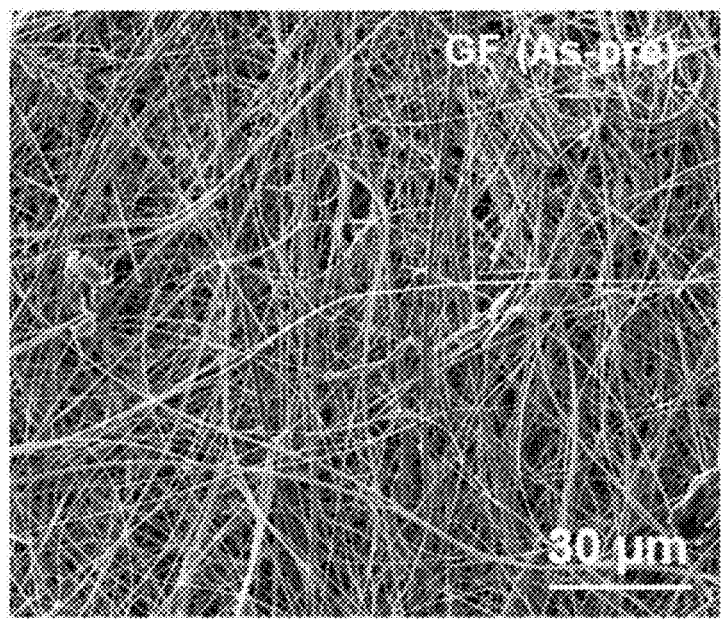
Figure 8F:
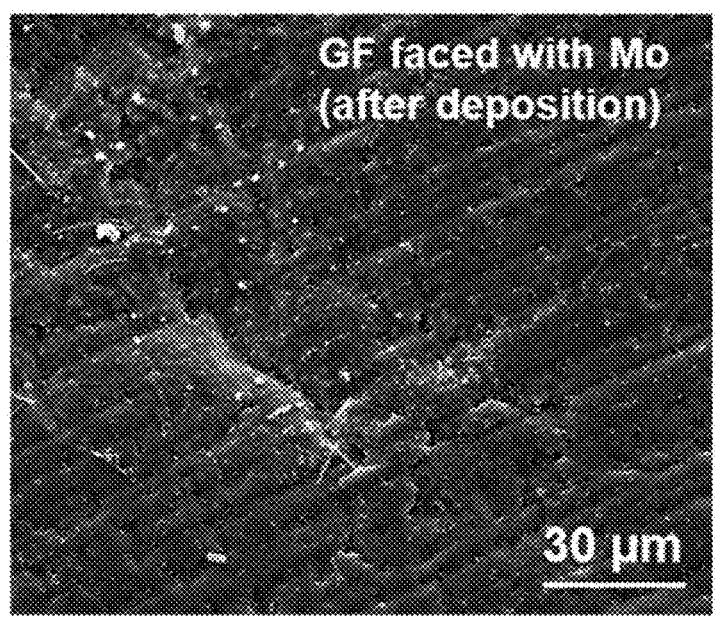
Figure 9A:
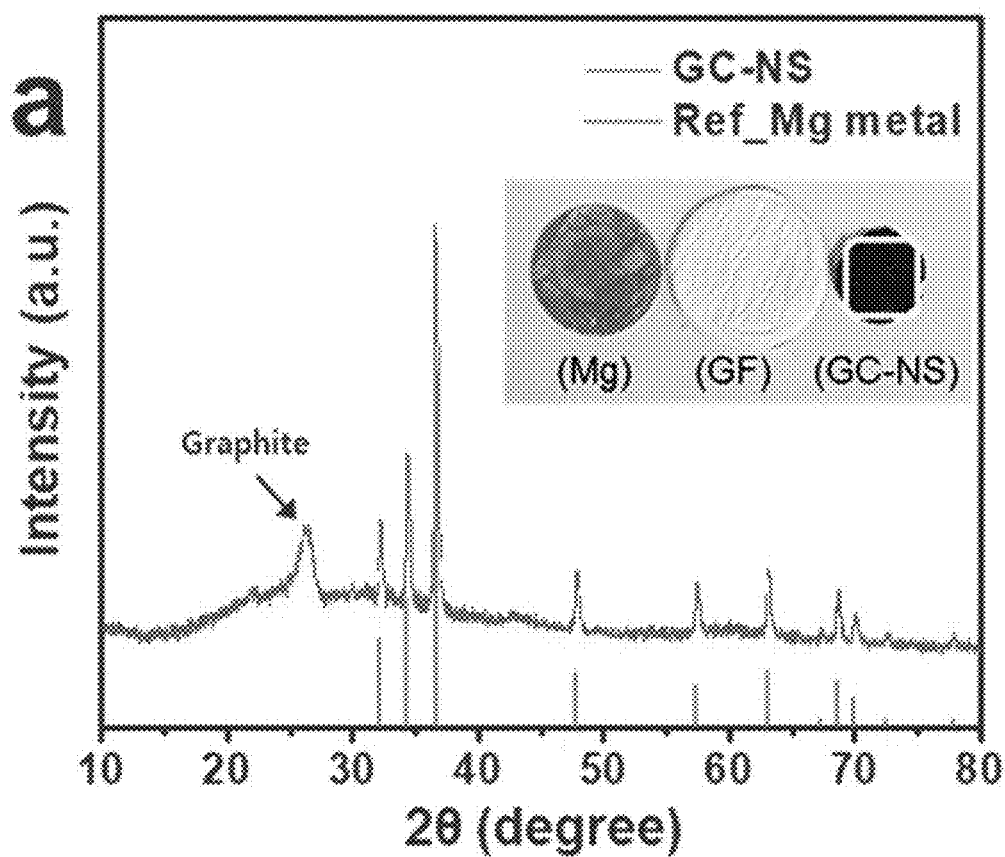
FIGS. 9A to 9F show XRD patterns of GC-NS-Anode (FIG. 9A) and GF separator (FIG. 9D) faced with the GC-NS-Anode after Mg metal deposition with an areal capacity of 5 $mAh/cm^2$ at a current rate of 0.2 $mA/cm^2$, SEM images of the GC-NS-Anode (FIG. 9B) and GF separator (FIG. 9E) before Mg metal deposition, and SEM images of the GC-NS-Anode (FIG. 9C) and GF separator (FIG. 9F) after Mg metal deposition.
Figure 9B:
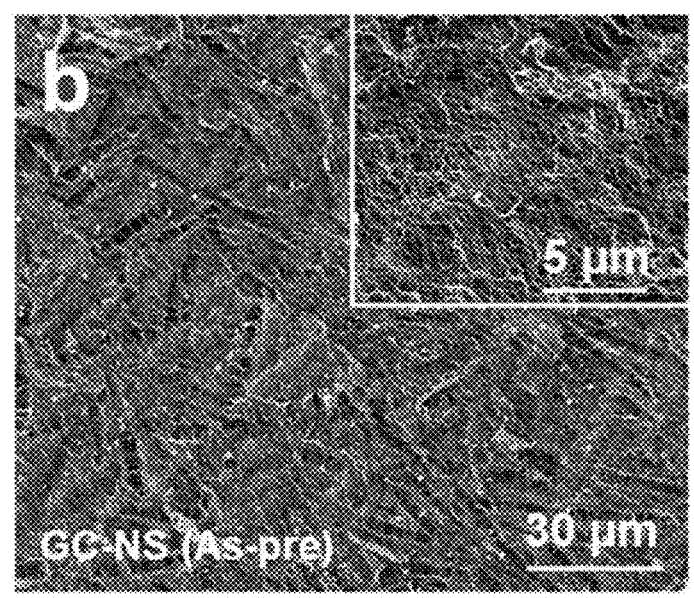
Figure 9C:
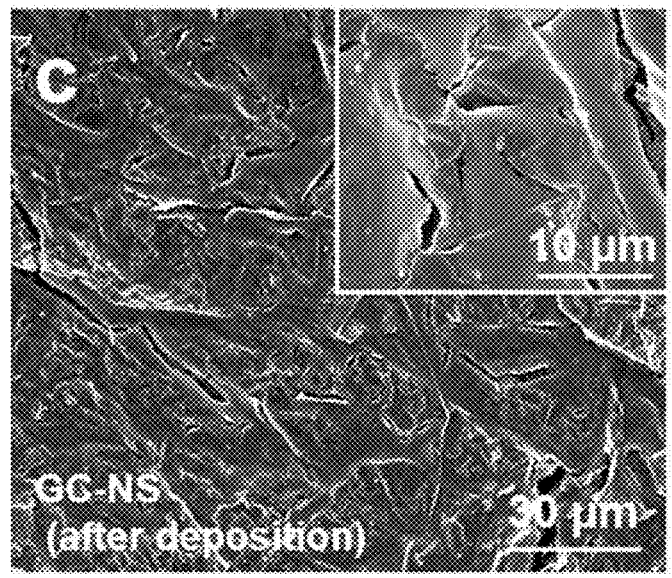
Figure 9D:
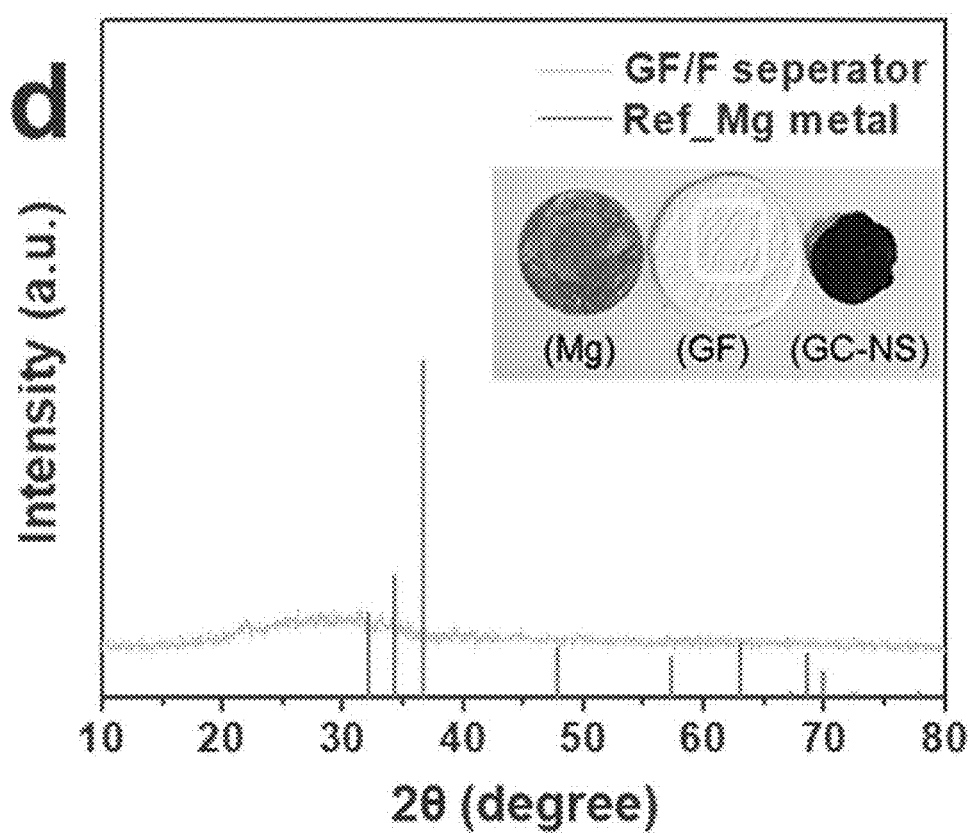
Figure 9E:
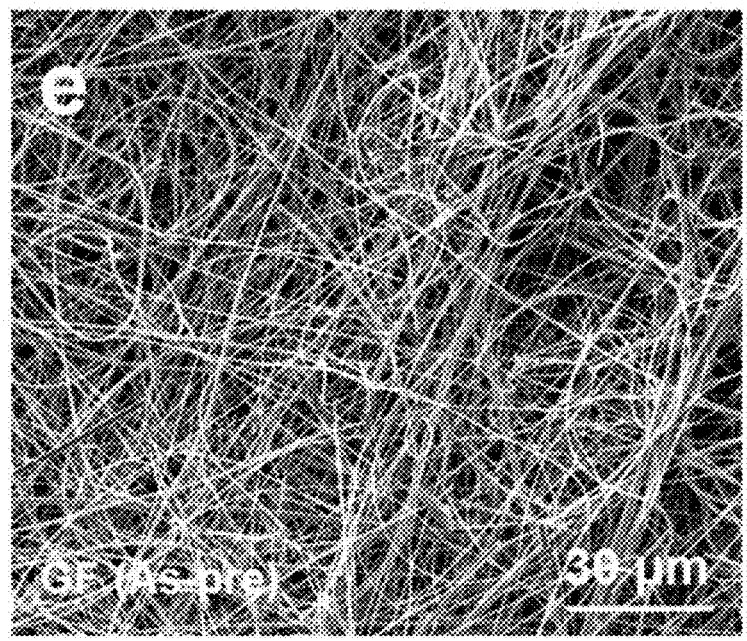
Figure 9F:
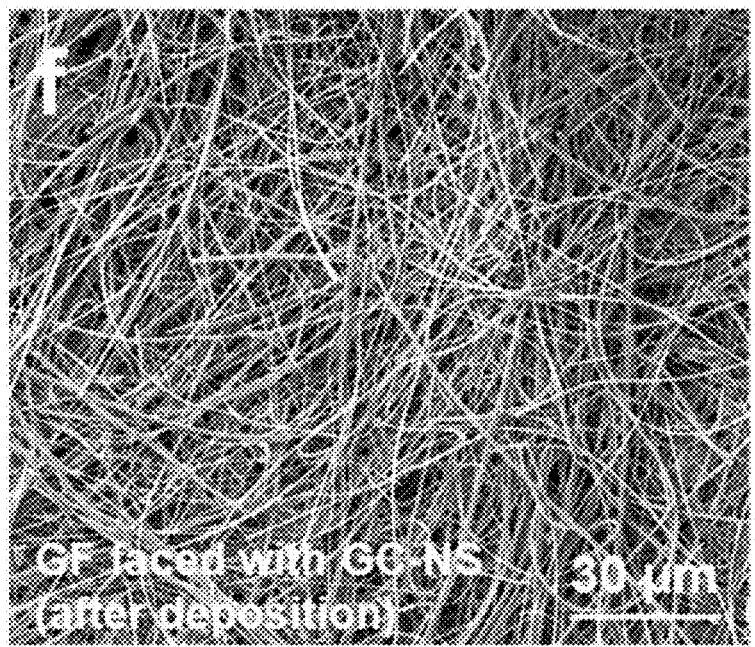

XRD and SEM were performed to examine where the electrochemically deposited Mg metal was located (FIGS. 8A to 8F and 9). In the case of the Mo-Anode, ex-situ XRD revealed the absence of Mg on the anode. Instead, the GF separator contained most of the electrochemically deposited Mg metals (FIGS. 8A to 8F), demonstrating the seriousness of unfavorable metal deposition. In contrast, the ex-situ XRD pattern of the GC-NS-Anode showed the characteristic Mg peaks, indicating the major presence of Mg metal on the anode (FIG. 8A), and its absence on the GF separator was also confirmed (FIGS. 8D to 8F).

Furthermore, ex-situ FE-SEM analysis showed that the calcined carbon material (GC-NSs) contained and attached the electrochemically formed Mg in the macropores and mesopores (FIGS. 10A to 10C), demonstrating the superiority of the calcined carbon material (GC-NSs) as a template for accommodating Mg metal.

Although Mo, Cu, and SS-based metal anodes have been used in previous studies, the effects on Mg metal deposition have not been of major interest. This result illustrates the unwanted Mg metal deposition behaviors on the separator.

Test Example 4

Investigation of Origin of the Mg Deposition

Figure 11A:
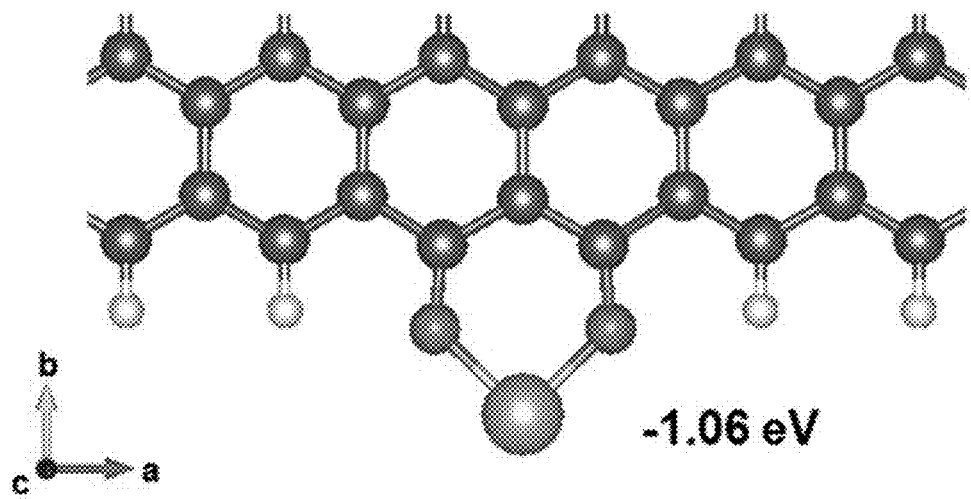
FIGS. 11A to 11D show relaxed configurations of Mg adsorption on graphene terminated with hydrogen and oxygen (FIG. 11A), showing the view normal to the graphene sheet and along the graphene sheet and the lowest surface energy slabs and relaxed configurations of Mg adsorption on Cu(111) (FIG. 11B), Mo(110) (FIG. 11C), and Mg(0001) (FIG. 11D)
Figure 11A:
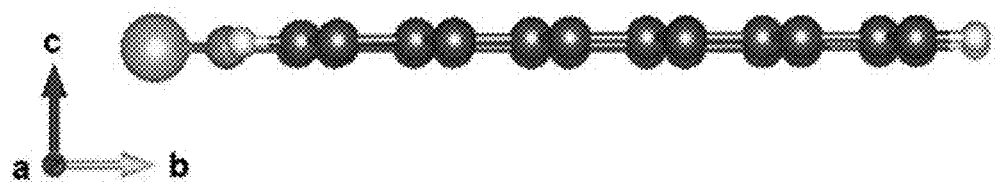
Figure 11B:
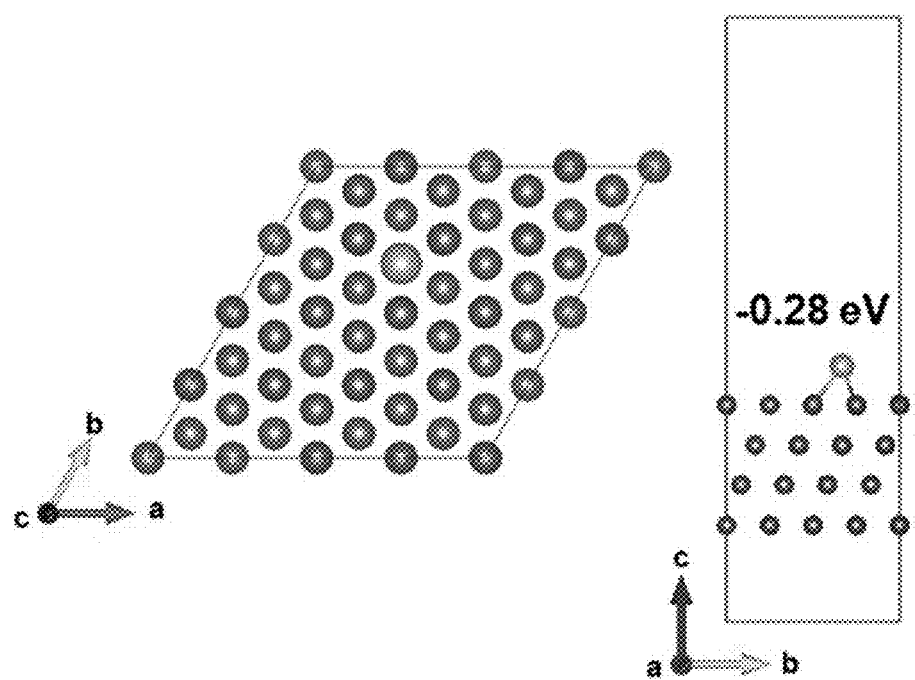
Figure 11C:
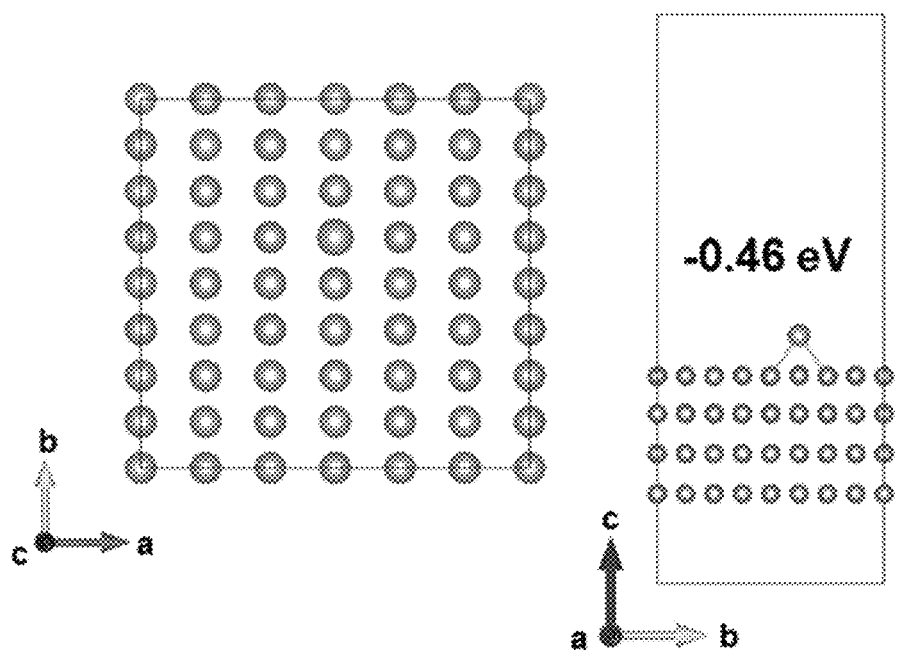
Figure 11D:
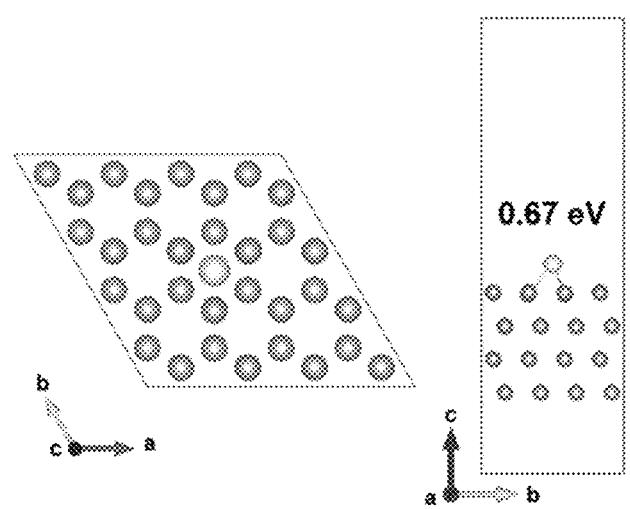

FIGS. 11A to 11D shows relaxed configurations of Mg adsorption on graphene terminated with hydrogen and oxygen (FIG. 11A), showing the view normal to the graphene sheet and along the graphene sheet and the lowest surface energy slabs and relaxed configurations of Mg adsorption on Cu(111) (FIG. 11B), Mo(110) (FIG. 11C), and Mg(0001) (FIG. 11D).

Figure 12A:
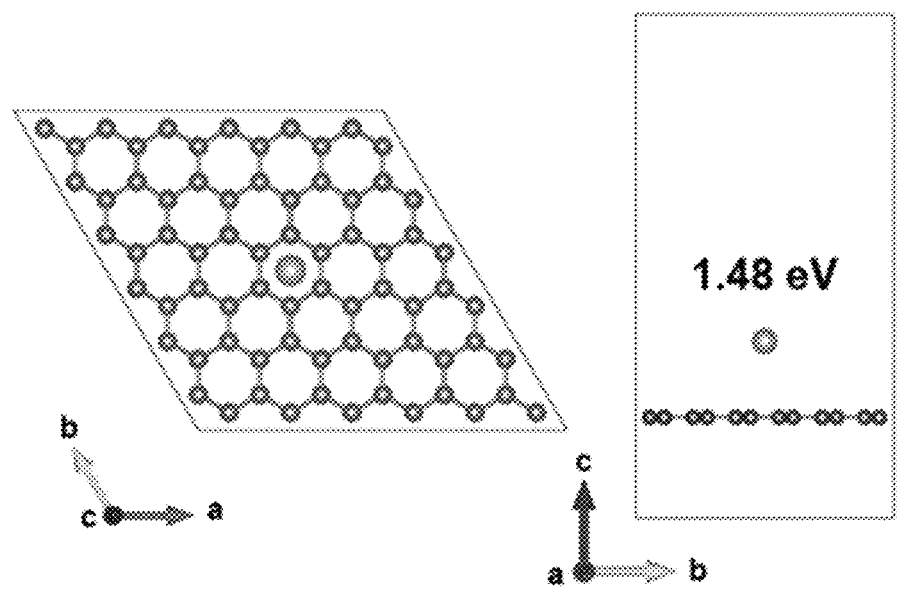
FIGS. 12A and 12B show relaxed configurations of Mg adsorption on graphene sheet without defects (FIG. 12A) and graphene sheet with a mono vacancy (FIG. 12B)
Figure 12B:
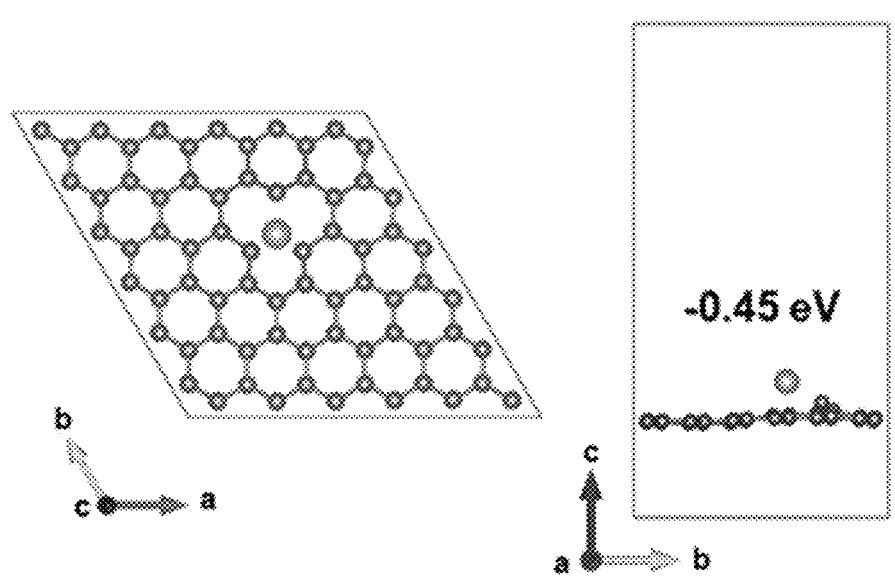

FIGS. 12A and 12B show relaxed configurations of Mg adsorption on graphene sheet without defects (FIG. 12A) and graphene sheet with a mono vacancy (FIG. 12B).

To investigate the origin of the favorable Mg metal deposition on the calcined carbon material, the affinity (i.e., absorption energy) for $Mg^{2+}$ ions at the graphene edges for the calcined carbon material was calculated using first-principles calculations and compared with Cu, Mo, and Mg substrates (FIGS. 11A to 11D).

The graphene sheets, where the edges are terminated with hydrogen atoms and heteroatoms, were designed, and the Mg atom was attached to the edge and fully relaxed. After considering the various bonding configurations, the most feasible absorption sites for Mg were confirmed to be the edge sites, where they neighbor with two oxygen atoms, exhibiting the highest chemisorption energy (−1.06 eV) (FIG. 11A).

In addition, absorption at the oxygen-terminated edges is more preferred than that on the basal plane of graphene (FIGS. 12A and 12B). A perfect graphene sheet without a defect would be thermodynamically inactive for accepting Mg (1.48 eV in FIG. 12A), and even in the case of defective graphene, the absorption energy (−0.45 eV in FIG. 12B) is relatively lower than that on the active edge sites. To describe the defective phase, graphene with a mono vacancy was chosen as a case study because it was demonstrated to be the most feasible sites for the Na ion absorption among the various vacancy types because of the large defect sites.

Considering that the calcined carbon material (GC-NSs) has numerous catalytic carbon edges bonded to oxygen heteroatoms, as shown experimentally in (a)-(e) of FIG. 1, favorable absorption could occur while the absorption energies onto Mo (−0.46 eV) and Cu (−0.28 eV) were relatively low (FIGS. 11B and 11C).

In particular, absorption on Mg metal (0.67 eV, FIG. 11D) is thermodynamically unfavorable, which would be the origin for the poor adhesion, as reported recently. Notably, the calculations were well matched with the experiment results of the adhesion test (FIGS. 7A to 7F). Although the calculation results could present a few feasible cases and only the lowest surface energy slabs of Cu, Mo, and Mg were considered, the results clearly show that the affinity of Mg depends on the substrate types, which should be considered when designing efficient rechargeable magnesium batteries (RMBs).

Moreover, the numerous catalytic edges of the calcined carbon material (GC-NSs) were highly advantageous for accommodating Mg ions in the structure.

Test Example 5

Cell Test

Figure 13A:
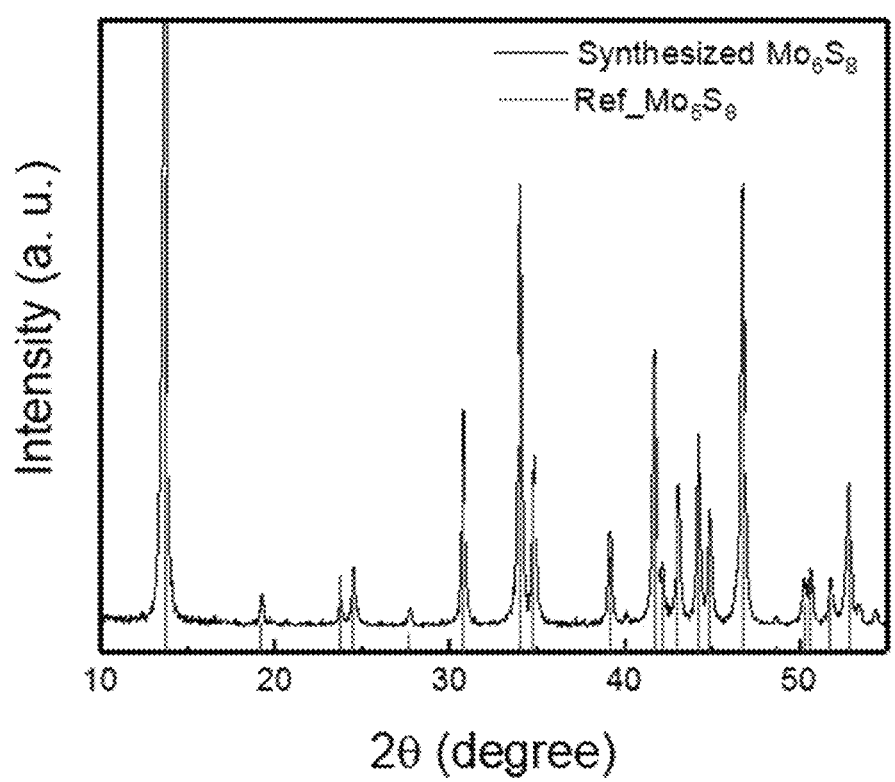
FIG. 13A shows an XRD pattern of the synthesized Chevrel-phase $Mo_6S_8$ and FIG. 13B shows electrochemical performances of full-cells composed of GC-NS-Anode or Mo-Anode with the Chevrel-phase Mo6S8 cathode in an all-phenyl-complex electrolyte.
Figure 13B:
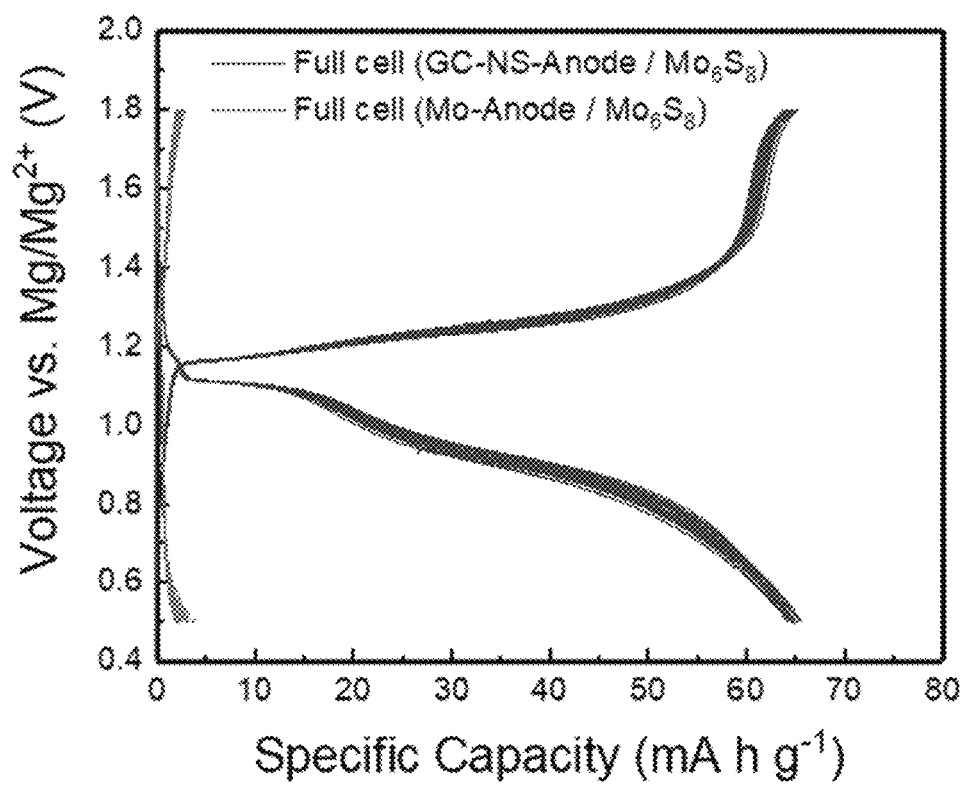

FIG. 13A shows an XRD pattern of the synthesized Chevrel-phase $Mo_6S_8$ and FIG. 13B shows electrochemical performances of full-cells composed of GC-NS-Anode or Mo-Anode with the Chevrel-phase $Mo_6S_8$ cathode in an all-phenyl-complex electrolyte.

Both the GC-NS and Mo anodes were predeposited with Mg to 5 mAh in the anode/separator/Mg metal half-cells. The anodes were then reassembled into full-cells (each composed of anode/new separator/$Mo_6S_8$). The galvanostatic charge and discharge were measured at a current density rate of 0.1 C between 0.5 V and 1.8 V.

The full-cell test of GC-NS-Anode demonstrates its feasibility as a stable and efficient anode for rechargeable Mg batteries (FIGS. 13A and 13B). The successful synthesis of Chevrel-phase $Mo_6S_8$ was demonstrated by X-ray diffraction (XRD), and the spectrum is shown in FIG. 13A.

The discharge-charge property of the GC-NS-full cell (blue line) was highly stable. Meanwhile, the full-cell configured as Mo-anode/new separator/$Mo_6S_8$ shows poor capacity (FIG. 13B), because most of the deposited Mg ions in the Mo-anode half-cell were clogged in the separator (FIGS. 7A to 7F).

This result demonstrates that Mg metal deposited on GC-NS-Anode works as the anode of a rechargeable Mg battery, whereas Mg-deposited Mo cannot function as the anode.

In summary, the inventive calcined carbon material (GC-NS) was demonstrated to play an important role in the electrochemical Mg metal deposition/stripping performance of Mg metal anode (MMA) for rechargeable magnesium batteries (RMBs). The performance of the fabricated calcined carbon material (GC-NS) greatly surpassed those of conventional metal substrate-based anodes.

In a galvanostatic Mg metal deposition process, the initial nucleation overpotential ($\eta_n$) and plateau overpotential ($\eta_n$) were reduced significantly with the calcined carbon material (GC-NSs) compared to those of the Mo-Anode. In addition, the VO and overpotential gaps between the GC-NS-Anode and Mo-Anode increased gradually with increasing current density.

One of the most noteworthy results revealed significantly improved CEs and cycling stabilities in the GC-NS-Anode. The ex situ experimental results and DFT data showed that $Mg^{2+}$ ions have high affinity to the calcined carbon material (GC-NSs), leading to favorable Mg metal deposition in the targeted macropores and mesopores. In contrast, metal-based substrates, which are used conventionally in rechargeable magnesium batteries (RMBs), show a relatively poor affinity to $Mg^{2+}$ ions, exhibiting unwanted Mg metal deposition behaviors on the GF and PP separators.

These results showed that the inventive calcined carbon material (catalytic carbon nanotemplates) rather than conventional metal-based substrates is essential to achieving high-performance rechargeable magnesium batteries (RMBs).

—Instruments and Calculations—

X-ray diffraction (XRD, Rigaku, MiniFlex) with Cu—Kα radiation was used to analyze the crystal structures of the products after the electrochemical test, and their morphologies were observed by field emission scanning electron microscopy (FE-SEM, FEI, Inspect F) and field emission transmission electron microscopy (FE-TEM, JEM2100F, JEOL, Japan).

The Raman spectra of the samples were recorded using a continuous-wave linearly polarized laser (532 nm, 2.41 eV, 16 mW). The laser beam was focused by a 100× objective lens, resulting in a spot diameter of ~1 μm. The acquisition time and number of cycles to collect each spectrum were 10 s and 3, respectively.

The chemical composition and depth profile were examined by XPS (PHI 5700 ESCA, Chanhassen, USA) using monochromatic Al Kα radiation.

The electrical conductivity of the GC-NSs was tested using an electrical conductivity meter (Loresta GP, Mitsubishi Chemical, Japan).

The porous properties of the GC-NSs were analyzed by nitrogen adsorption and desorption isotherms obtained using a surface area analyzer and a porosimetry analyzer (ASAP 2020, Micromeritics, USA) at −196° C.

The electrochemical cells for the Mg batteries were assembled into 2032-type coin cells in an argon-filled glovebox (<1 ppm $O_2$ and <1 ppm $H_2O$).

All the cell components were washed prior to use and prepared carefully without exposure to air. The scratched Mg metal disk (99.95% metals basis, Alfa Aesar) was assembled into a coin cell as quickly as possible in an argon-filled glovebox.

All phenyl complex (APC) electrolytes were prepared by mixing 0.5 M $AlCl_3$ and 2.0 M PhMgCl in tetrahydrofuran (THF) solvent, which was maintained with a molecular sieve (4 Å) to remove the residual water (<10 ppm measured by the Karl-Fischer coulometer, Metrohm).

To prepare the substrate for reversible Mg metal storage, the GC-NS material was punched into cylinders of diameter ½ in. These cylinders were used as the working electrode without active material (Mg metal) in the half-cell test. Mg metal was deposited on the metal-free GC-NSs (substrate) during the discharge process, and was fully dissolved during the charge process.

The pristine working electrode without active material (GC-NCs) in the half-cell is simply named the 'anode'.

In addition, the CE was calculated from the discharge/charge cycles on the metal-free GC-NSs anode.

In the full-cell system, the Chevrel-phase $Mo_6S_8$ cathode material cannot source Mg, so Mg metal was pre-deposited to 5 mAh on GC-NC in the GC-NS/separator/Mg metal half-cell. The metal-deposited GC-NC-Anode was then dissembled and re-assembled into a full-cell configured as GC-NS-Anodes/new separator/$Mo_6S_8$.

The electrochemical properties measured using a potentio-galvanostat (WonA Tech, WBCS 3000) and the capacities were calculated based on the area of the substrates.

All calculations were performed using density functional theory (DFT) as implemented in the Vienna Ab initio Simulation Package (VASP). The DFT calculations were based on the projector augmented wave method (PAW).

The Perdew-Burke-Ernzerhof (PBE)-generalized gradient approximation (GGA) was used for the exchange-correlation energy functional. An energy cut off of 500 eV was used for the plane wave basis set. The convergence criterion for the electronic self-consistency loop was $10^{-5}$ eV, and the atomic positions were relaxed until the forces were less than 0.03 eV/Å.

The optimal lattice parameters of the bulk system were obtained by fitting the energy versus volume to the Murnaghan equation of state. The lowest surface energy slabs, Mg(0001), Cu(111), and Mo(110), were used for the calculation. Supercells were generated to minimize the effects of periodic Mg atoms, increasing the number of atoms to 64, 64, 96, and 72 for Mg, Cu, Mo, and graphene slabs, respectively.

The graphene sheets with a mono vacancy and oxygen termination were obtained from the previous reports. A vacuum layer of 25 Å was included in the supercells and the calculations employed gamma-centered grids with a 2×2×1 mesh.

Ionic relaxation was performed for all atoms, whereas the back two layers were fixed for Mg, Cu, and Mo slabs for their bulk-like positions. The Mg adsorption energy, $E_{ad}$, was evaluated as $E_{ad}=E_{total}-E_{substrate}-E_{Mg}$, where $E_{total}$, $E_{substrate}$, and $E_{Mg}$ are the total energies of the entire system, substrate, and metallic Mg, respectively.

What is claimed is:

1. A calcined carbon material for a magnesium battery anode comprising catalytic carbon nanotemplates having a network structure in which nanofibers are entangled three-dimensionally, wherein the nanofibers are 10 to 25 nm in diameter and 10 μm to 1000 μm in length; and wherein the calcined carbon material is prepared from *Gluconacetobacter xylinum*.

2. The calcined carbon material according to claim 1, wherein the calcined carbon material contains a mixture of macropores having a pore size exceeding 50 nm and mesopores having a pore size of 20 to 30 nm.

3. The calcined carbon material according to claim 1, wherein the calcined carbon material has a BET specific surface area of 90 to 120 $m^2/g$.

4. A magnesium battery anode comprising the calcined carbon material according to claim 1.

5. A magnesium secondary battery comprising the magnesium battery anode according to claim 4.

6. The magnesium secondary battery according to claim 5, wherein the magnesium secondary battery uses includes an all-phenyl complex electrolyte.

7. The magnesium secondary battery according to claim 6, wherein the all-phenyl complex electrolyte is a mixture of aluminum chloride ($AlCl_3$) and phMgCl in an organic solvent.

8. The magnesium secondary battery according to claim 5, wherein the aluminum chloride ($AlCl_3$) and the phMgCl are mixed in a molar ratio of 1:3-7.

9. A capacitor comprising the magnesium battery anode according to claim 4.

10. A system comprising the magnesium battery anode according to claim 4 wherein the system is selected from the group consisting of communication equipment, energy storage systems (ESSs), and vehicles.

* * * * *